(12) United States Patent
Sakurada et al.

(10) Patent No.: US 12,421,566 B2
(45) Date of Patent: Sep. 23, 2025

(54) HOT-ROLLED STEEL SHEET AND MANUFACTURING METHOD THEREOF

(71) Applicant: NIPPON STEEL CORPORATION, Tokyo (JP)

(72) Inventors: Eisaku Sakurada, Tokyo (JP); Takashi Yasutomi, Tokyo (JP); Genki Abukawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 526 days.

(21) Appl. No.: 17/908,553

(22) PCT Filed: Apr. 21, 2021

(86) PCT No.: PCT/JP2021/016130
§ 371 (c)(1),
(2) Date: Sep. 1, 2022

(87) PCT Pub. No.: WO2021/225073
PCT Pub. Date: Nov. 11, 2021

(65) Prior Publication Data
US 2023/0140766 A1    May 4, 2023

(30) Foreign Application Priority Data
May 8, 2020    (JP) .................. 2020-082655

(51) Int. Cl.
*C21D 8/02*    (2006.01)
*B21C 47/02*    (2006.01)
(Continued)

(52) U.S. Cl.
CPC ............ *C21D 8/0226* (2013.01); *B21C 47/02* (2013.01); *C21D 8/0263* (2013.01); *C21D 9/46* (2013.01);
(Continued)

(58) Field of Classification Search
CPC ....... B21C 47/02; B22D 11/16; B32B 15/013; C21D 1/02; C21D 1/25; C21D 1/26; C21D 2201/05; C21D 2211/001; C21D 2211/002; C21D 2211/005; C21D 2211/008; C21D 2211/009; C21D 8/021; C21D 8/0226;
(Continued)

(56) References Cited

FOREIGN PATENT DOCUMENTS

JP    3858146 B2    12/2006
JP    5068688 B2    11/2012

OTHER PUBLICATIONS

Matsuno et al., "Fatigue Strength of High-Strength Steel Sheets after Tension-Compression and Surface Friction", Plasticity and Processing (Journal of the Japan Society for Technology of Plasticity), Jul. 2016, vol. 57, No. 666, pp. 660-666.

*Primary Examiner* — Jenny R Wu
(74) *Attorney, Agent, or Firm* — Birch, Stewart, Kolasch & Birch, LLP

(57) ABSTRACT

This hot-rolled steel sheet has a predetermined chemical composition and predetermined metallographic structure, a ratio between a maximum depth of a region where, on one surface, a rotation angle between a normal line of the one surface and a (011) pole near the normal line of the one surface is 5° or less and a maximum depth of a region where, on the other surface, a rotation angle between a normal line of the other surface and a (011) pole near the normal line of the other surface is 5° or less is 1.00 to 1.20, and a tensile strength is 1150 MPa or more.

7 Claims, 3 Drawing Sheets

(51) Int. Cl.
- *C21D 9/46* (2006.01)
- *C22C 38/00* (2006.01)
- *C22C 38/02* (2006.01)
- *C22C 38/04* (2006.01)
- *C22C 38/06* (2006.01)
- *C22C 38/22* (2006.01)
- *C22C 38/24* (2006.01)
- *C22C 38/26* (2006.01)
- *C22C 38/28* (2006.01)
- *C22C 38/32* (2006.01)
- *C23C 2/40* (2006.01)

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C23C 2/40* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC ...... C21D 8/0263; C21D 9/46; C22C 38/001; C22C 38/002; C22C 38/02; C22C 38/04; C22C 38/06; C22C 38/12; C22C 38/14; C22C 38/22; C22C 38/24; C22C 38/26; C22C 38/28; C22C 38/32; C22C 38/38; C23C 2/02; C23C 2/06; C23C 2/12; C23C 2/28; C23C 2/40
See application file for complete search history.

HOT-ROLLED STEEL SHEET AND MANUFACTURING METHOD THEREOF

TECHNICAL FIELD

The present invention relates to a hot-rolled steel sheet and a manufacturing method thereof.

Priority is claimed on Japanese Patent Application No. 2020-082655, filed May 8, 2020, the content of which is incorporated herein by reference.

BACKGROUND ART

In recent years, weight reduction of automobiles and each machine component has been underway. Designing an optimum shape as the component shape ensures stiffness and thereby makes it possible to reduce the weights of automobiles and each machine component. Furthermore, in blank-formed components such as a press-formed component, the weights can be reduced by reducing the sheet thicknesses of component materials. However, in the case of attempting to ensure the strength characteristics of components such as static fracture strength and yield strength while reducing the sheet thicknesses, it becomes necessary to use high-strength materials. In particular, for automobile suspension components such as lower control arms, trailing arms, or knuckles, studies have begun about the application of higher than 780 MPa class steel sheets. Since these automobile suspension components are manufactured by performing burring, stretch flanging, bending forming, and the like on steel sheets, steel sheets that are applied to these automobile suspension components are required to have excellent formability.

For example, Patent Document 1 discloses a hot-rolled steel sheet in which, in a hot rolling step, the finish rolling temperature and the rolling reduction are set within predetermined ranges, thereby controlling the grain sizes and aspect ratios of prior austenite and reducing anisotropy.

Patent Document 2 discloses a cold-rolled steel sheet in which, in a hot rolling step, the rolling reduction and the average strain rate are set within appropriate ranges in a predetermined finish rolling temperature range, thereby improving the toughness.

In order to further reduce the weights of automobiles, each machine component, and the like, it is also expected to apply steel sheets having a sheet thickness premised on a cold-rolled steel sheet to automobile suspension components. The techniques described in Patent Document 1 and Patent Document 2 are effective in the manufacturing of automobile suspension components to which a high strength steel sheet is applied. In particular, these techniques are important findings for obtaining an effect relating to the formability and impact properties of suspension components of automobiles having a complicated shape.

However, automobile suspension components always receive cyclic loads attributed to weight-induced vibration, turning, obduction, and the like. Therefore, durability suitable for components is an important characteristic. As described above, suspension components of automobiles are subjected to various formings. In a flat portion near the inside of an R portion that has been bent or bent and bent back, there are many places where the contact with a die is weak. Such a flat portion near the inside of the R portion has surface properties in which relatively sharp recessed parts are periodically formed due to the development of unevenness on the surface layer by forming and contact with a die at a weak load (hereinafter, a change in such surface properties will be referred to as forming damage).

For example, in Non-Patent Document 1, the development of unevenness on the surface layer by such forming near the inside bend is simulated by uniaxial distortion, and the fatigue properties of a steel sheet that has been brought into contact with a die are investigated. These fatigue properties of the steel sheet are degraded by recessed parts, but it has been investigated that the changes differ depending on the metallographic structure. In higher than 780 MPa class steel sheets that are applied to automobile suspension components, the volume percentage of the full hard structure increases in order to develop strength, but there are no techniques that sufficiently improve the fatigue properties of steel sheets that have been forming-damaged in such a strength region.

CITATION LIST

Patent Document

Patent Document 1: Japanese Patent No. 5068688
Patent Document 2: Japanese Patent No. 3858146

Non Patent Document

Non Patent Document 1: Sosei-To-Kakou (Journal of the Japan Society for Technology of Plasticity) Vol. 57, No. 666 (2016-7) p. 660 to 666

SUMMARY OF INVENTION

Technical Problem

The present inventors performed technical development in order to reduce forming damage to improve fatigue properties. The present inventors newly found that, in a case where the depths of recessed parts exceed a certain value, the fatigue properties of hot-rolled steel sheets significantly deteriorate.

Notch sensitivity increases as the strength of a steel sheet becomes higher. Therefore, in order to apply higher than 780 MPa class high strength steel sheets to automobile suspension components, it is necessary to improve the fatigue properties of forming-damaged portions. One of methods for reducing the depths of recessed parts is to increase the contacting contact pressure of a die. However, the contacting contact pressure of a die is a forming factor that controls the amount of plastic viscous flow during forming. In addition, in the case of pressing a high strength steel sheet into a complicated shape, it is difficult to increase the contact pressure under a predetermined press load.

In view of the above-described circumstances, an object of the present invention is to provide a hot-rolled steel sheet having a high strength and excellent formability and having excellent fatigue properties in a forming-damaged portion and a manufacturing method thereof.

Solution to Problem

As a result of inventive studies, the present inventors paid attention to the fact that the depths of recessed parts in a forming-damaged portion is derived from the uneven distortion of the front and back surfaces of a hot-rolled steel sheet during forming and found that there is a relationship between the depths of the recessed parts after contact with a die (after forming) and the characteristics of macroscopic crystal orientation distributions on the front and back surfaces of the steel sheet. The present inventors found that, when appropriate chemical composition and metallographic structure for obtaining a high strength and excellent formability are given and, furthermore, specific crystal orientations in the sheet thickness direction on the front and back surfaces are controlled, it is possible to reduce the depths of the recessed parts in the forming-damaged portion and thereby suppress the deterioration of the fatigue properties of the forming-damaged portion.

The gist of the present invention made based on the above-described findings is as follows.

(1) A hot-rolled steel sheet according to one aspect of the present invention containing, as a chemical composition, by mass %,
- C: 0.085% to 0.190%,
- Si: 0.40% to 1.40%,
- Mn: 1.70% to 2.75%,
- Al: 0.01% to 0.55%,
- Nb: 0.006% to 0.050%,
- P: 0.080% or less,
- S: 0.010% or less,
- N: 0.0050% or less,
- Ti: 0.004% to 0.180%,
- B: 0.0004% to 0.0030%,
- Mo: 0% to 0.150%,
- V: 0% to 0.300%,
- Cr: 0% to 0.500%,
- Ca: 0% to 0.0020%, and
- a remainder comprising Fe and an impurity,
- in which, in metallographic structures at a ¼ position in a sheet thickness direction from a surface and at a ½ position in the sheet thickness direction from the surface, by vol %,
- residual austenite is 3.0% to 12.0%,
- bainite is 75.0% or more and less than 97.0%,
- ferrite is 10.0% or less,
- martensite is 10.0% or less, and
- pearlite is 3.0% or less,
- in a metallographic structure of a region from the surface to a 100 μm position in the sheet thickness direction from the surface,
- an average grain diameter of prior austenite grains is 25.0 μm or less,
- a ratio between a maximum depth of a region where, on one surface, a rotation angle between a normal line of the one surface and a (011) pole near the normal line of the one surface is 5° or less and a maximum depth of a region where, on the other surface, a rotation angle between a normal line of the other surface and a (011) pole near the normal line of the other surface is 5° or less is 1.00 to 1.20, and
- a tensile strength is 1150 MPa or more.

(2) The hot-rolled steel sheet according to (1) may further contain, as the chemical composition, by mass %, one or more selected from the group consisting of,
- Mo: 0.030% to 0.150%,
- V: 0.050% to 0.300%,
- Cr: 0.050% to 0.500%, and
- Ca: 0.0006% to 0.0020%.

(3) A manufacturing method of a hot-rolled steel sheet according to another aspect of the present invention is a manufacturing method of the hot-rolled steel sheet according to (1) or (2), including
- a continuous casting step of, in continuous casting of a slab having the chemical composition according to (1), performing the continuous casting in a manner that an average cooling rate gradient of a surface temperature in a region from a meniscus to 1.0 m from the meniscus is 0.20 to 15.00° C./s² to obtain the slab,
- a heating step of heating the slab to 1200° C. or higher,
- a hot rolling step of performing rough rolling on the slab after the heating, and performing finish rolling in a manner that a total rolling reduction in a temperature range of 870° C. to 980° C. becomes 80% or larger and an elapsed time between rolling stands becomes 4.00 seconds or shorter in the temperature range of 870° C. to 980° C.,
- a cooling step of cooling to a temperature range of 300° C. to 550° C., and
- a coiling step of coiling in a manner that a coiling temperature is in the temperature range of 300° C. to 550° C. after the cooling.

(4) The manufacturing method of the hot-rolled steel sheet according to (3) may further include a tempering step of holding in a temperature range of 200° C. or higher and lower than 450° C. for 90 to 80000 seconds after the coiling step.

(5) The manufacturing method of the hot-rolled steel sheet according to (3) or (4) may further include a plating step of performing a hot-dip galvanizing treatment on the hot-rolled steel sheet after the coiling step or the hot-rolled steel sheet after the tempering step with a thermal history where a residence time within a temperature range of 450° C. to 495° C. becomes 75 seconds or shorter.

Advantageous Effects of Invention

According to the above-described aspects of the present invention, it is possible to provide a hot-rolled steel sheet having a high strength and excellent formability and having excellent fatigue properties in a forming-damaged portion and a manufacturing method thereof. According to the above-described aspects of the present invention, since the fatigue properties in a forming-damaged portion are excellent, it is possible to reduce the depths of recessed parts in a flat portion near an R portion that is formed at the time of forming the R portion.

EMBODIMENTS OF THE INVENTION

Figure 1:
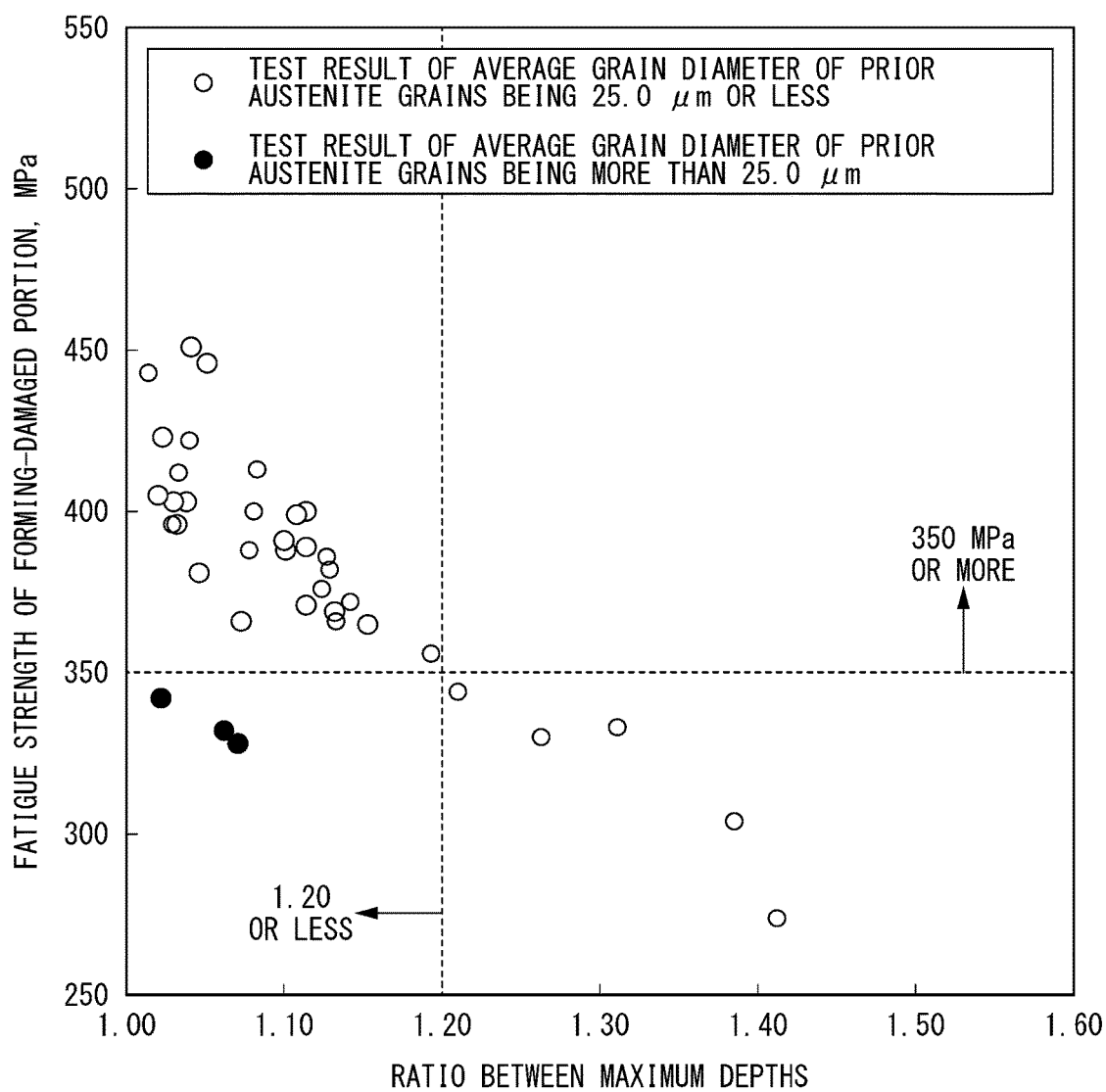
FIG. 1 is a view showing a relationship between a fatigue strength and a maximum depth ratio in a forming-damaged portion in an example.

Hereinafter, a hot-rolled steel sheet according to the present embodiment will be described in detail. However, the present invention is not limited only to a configuration disclosed in the present embodiment and can be modified in a variety of manners within the scope of the gist of the present invention.

Numerical limiting ranges expressed below using "to" include the lower limit and the upper limit in the ranges. Numerical values expressed with "more than" and "less than" are not included in numerical ranges. "%" regarding chemical compositions all indicates "mass %".

The hot-rolled steel sheet according to the present embodiment contains, by mass %, C: 0.085% to 0.190%, Si: 0.40% to 1.40%, Mn: 1.70% to 2.75%, Al: 0.01% to 0.55%, Nb: 0.006% to 0.050%, P: 0.080% or less, S: 0.010% or less, N: 0.0050% or less, Ti: 0.004% to 0.180%, B: 0.0004% to 0.0030%, Mo: 0% to 0.150%, V: 0% to 0.300%, Cr: 0% to 0.500%, Ca: 0% to 0.0020%, and a remainder comprising Fe and an impurity. Hereinafter, each element will be described in detail.

C: 0.085% to 0.190%

C is one of the elements that determines the strength of the hot-rolled steel sheet and also affects the amount of residual austenite. When the C content is less than 0.085%, it is not possible to set the volume percentage of residual austenite to 3.0% or more. Therefore, the C content is set to 0.085% or more. The C content is preferably 0.115% or more.

On the other hand, when the C content is more than 0.190%, the volume percentage of residual austenite increases, and the hole expansibility of the hot-rolled steel sheet deteriorates. Therefore, the C content is set to 0.190% or less. The C content is preferably 0.170% or less.

Si: 0.40% to 1.40%

Si is an element that improves the strength of hot-rolled steel sheet by solid solution strengthening. In addition, Si is also an element that suppresses the formation of a carbide such as pearlite. In order to obtain these effects, the Si content is set to 0.40% or more. The Si content is preferably 0.90% or more. In a case where the Si content is less than 0.40%, the volume percentage of residual austenite becomes less than 3.0%, and the volume percentage of pearlite exceeds 3.0%.

On the other hand, when the Si content increases, the volume percentage of residual austenite increases; however, when the Si content exceeds 1.40%, the volume percentage of residual austenite exceeds 12.0%, which degrades the hole expansibility of the hot-rolled steel sheet. Additionally, since Si has a high oxide-forming capability, when the Si content is excessive, an oxide is formed in a weld or the chemical convertibility of the hot-rolled steel sheet is degraded in a component manufacturing step. Therefore, the Si content is set to 1.40% or less. The Si content is preferably 1.30% or less.

Mn: 1.70% to 2.75%

Mn is an element necessary to improve the strength of the hot-rolled steel sheet. When the Mn content is less than 1.70%, the volume percentage of ferrite exceeds 10.0%, which makes it impossible to obtain a tensile strength of 1150 MPa or more. Therefore, the Mn content is set to 1.70% or more. The Mn content is preferably 1.80% or more.

On the other hand, when the Mn content exceeds 2.75%, the toughness of a cast slab deteriorates, and hot rolling is not possible. Therefore, the Mn content is set to 2.75% or less. The Mn content is preferably 2.70% or less.

Al: 0.01% to 0.55%

Al is an element that acts as a deoxidizing agent and improves the cleanliness of steel. In order to obtain this effect, the Al content is set to 0.01% or more. The Al content is preferably 0.10% or more.

On the other hand, when the Al content is more than 0.55%, casting becomes difficult. Therefore, the Al content is set to 0.55% or less. Al is an oxidizing element, and the Al content is preferably 0.30% or less in order to obtain an effect on additional improvement in continuous castability and a cost reduction effect.

Nb: 0.006% to 0.050%

Nb suppresses the abnormal grain growth of austenite grains in a hot rolling step and thereby decreases the depths of recessed parts in a forming-damaged portion. In order to obtain this effect, the Nb content is set to 0.006% or more. When the Nb content is set to 0.025% or more, the above-described effect is saturated.

On the other hand, when the Nb content is more than 0.050%, the toughness of the cast slab deteriorates, and hot rolling is not possible. Therefore, the Nb content is set to 0.050% or less. The Nb content is preferably 0.025% or less.

P: 0.080% or Less

P is an impurity element that is inevitably incorporated into the hot-rolled steel sheet in a manufacturing process of the hot-rolled steel sheet. The higher the P content, the more the hot-rolled steel sheet embrittles. In a case where the hot-rolled steel sheet is applied to automobile suspension components, a P content of up to 0.080% is acceptable. Therefore, the P content is set to 0.080% or less. The P content is preferably 0.010% or less. When the P content is reduced to less than 0.0005%, the dephosphorization cost significantly increases, and thus the P content may be set to 0.0005% or more.

S: 0.010% or Less

In a case when a large amount of S is contained in molten steel, MnS is formed, and the ductility and toughness of the hot-rolled steel sheet are degraded. Therefore, the S content is set to 0.010% or less. The S content is preferably 0.008% or less. When the S content is reduced to less than 0.0001%, the desulfurization cost significantly increases, and thus the S content may be set to 0.0001% or more.

N: 0.0050% or Less

N is an impurity element that is inevitably incorporated into the hot-rolled steel sheet in the manufacturing process of the hot-rolled steel sheet. When the N content becomes more than 0.0050%, the hole expansibility of the hot-rolled steel sheet deteriorates. Therefore, the N content is set to 0.0050% or less. The N content is preferably 0.0040% or less. When the N content is reduced to less than 0.0001%, the steelmaking cost significantly increases, and thus the N content may be set to 0.00010% or more.

Ti: 0.004% to 0.180%

Ti has an effect on the enhancement of an effect of B contained, which will be described below, by forming a nitride. In order to obtain this effect, the Ti content is set to 0.004% or more. The Ti content is preferably 0.006% or more. In order to enhance the effect of B contained by containing Ti, the Ti content needs to be set to 0.013% or more.

On the other hand, Ti is an element that degrades the toughness of a slab. In a case where the Ti content exceeds 0.180%, there are a case where slab cracking occurs frequently and a case where the solutionizing cost is increased. Therefore, Ti is set to 0.180% or less. The Ti content is preferably 0.140% or less or 0.100% or less.

B: 0.0004% to 0.0030%

B is an element that suppresses the formation of ferrite in a cooling step. In order to obtain this effect, the B content is set to 0.0004% or more. The B content is preferably 0.0011% or more.

On the other hand, even when more than 0.0030% of B is contained, the above-described effect is saturated, and thus the B content is set to 0.0030% or less. The B content is preferably 0.0020% or less.

The remainder of the chemical composition of the hot-rolled steel sheet according to the present embodiment may be Fe and an impurity. In the present embodiment, the impurity means a substance that is incorporated from ore as a raw material, a scrap, a manufacturing environment, or the like and is allowed to an extent that the hot-rolled steel sheet according to the present embodiment is not adversely affected.

The hot-rolled steel sheet according to the present embodiment may contain one or more of the group consisting of Mo, V, Cr, and Ca as an arbitrary element instead of some of Fe. In a case where the arbitrary element is not contained, the lower limit of the content is 0%. Hereinafter, each arbitrary element will be described.

Mo: 0% to 0.150%

Mo is an element that enhances the hardenability of steel and may be contained as an element that adjusts the strength of the hot-rolled steel sheet. In order to reliably obtain the above-described effect, the Mo content is preferably set to 0.030% or more. On the other hand, even when more than 0.150% of Mo is contained, the above-described effect is saturated. Therefore, the Mo content is preferably set to 0.150% or less.

V: 0% to 0.300%

V has an effect on the enhancement of the strength by forming a fine carbide. In order to reliably obtain this effect, the V content is preferably set to 0.050% or more. However, when V is excessively contained, a nitride is formed in steel, which degrades the slab toughness and makes threading difficult. Therefore, the V content is preferably set to 0.300% or less.

Cr: 0% to 0.500%

Cr is an element that develops an effect similar to that of Mn. In order to reliably obtain a strength improvement effect of the hot-rolled steel sheet, the Cr content is preferably set to 0.050% or more. On the other hand, even when more than 0.500% of Cr is contained, the above-described effect is saturated. Therefore, the Cr content is preferably set to 0.500% or less.

Ca: 0% to 0.0020%

Ca forms fine CaS, thereby improving the local ductility and improving the hole expansibility. However, when the Ca content is more than 0.0020%, the manufacturability is degraded due to the formation of oxides at the nozzle during continuous casting, and the formability deteriorates due to the entrainment of these oxides. Therefore, the Ca content is preferably set to 0.0020% or less. In order to obtain the above-described effect, the Ca content is preferably set to 0.0006% or more.

The above-described chemical composition of the hot-rolled steel sheet may be analyzed using a spark discharge emission spectrophotometer or the like. For C and S, values identified by combusting the hot-rolled steel sheet in an oxygen stream using a gas component analyzer or the like and measuring C and S by an infrared absorption method are adopted. In addition, for N, a value identified by melting a test piece collected from the hot-rolled steel sheet in a helium stream and measuring N by a thermal conductivity method is adopted.

Next, the metallographic structure of the hot-rolled steel sheet according to the present embodiment will be described. The characteristics of the metallographic structure are limited to an effect on improvement in the strength and formability of the hot-rolled steel sheet and also to an extent that the fatigue properties in a forming-damaged portion can be improved.

In the hot-rolled steel sheet according to the present embodiment, in the metallographic structures at a ¼ position in the sheet thickness direction from the surface and at a ½ position in the sheet thickness direction from the surface, by vol %, residual austenite is 3.0% to 12.0%, bainite is 75.0% or more and less than 97.0%, ferrite is 10.0% or less, martensite is 10.0% or less, and pearlite is 3.0% or less, in the metallographic structure in a region from the surface to a 100 μm position in the sheet thickness direction from the surface, the average grain diameter of prior austenite grains is 25.0 μm or less, and the ratio between the maximum depth of a region where, on one surface, the rotation angle between the normal line of the one surface and a (011) pole near the normal line of the one surface is 5° or less and the maximum depth of a region where, on the other surface, the rotation angle between the normal line of the other surface and a (011) pole near the normal line of the other surface is 5° or less is 1.00 to 1.20.

Hereinafter, each regulation will be described.

Residual Austenite: 3.0% to 12.0%

The volume percentage of residual austenite needs to be 3.0% or more in order to enhance the ductility of the hot-rolled steel sheet. In order to improve the fatigue properties of the hot-rolled steel sheet, the volume percentage of the residual austenite is preferably set to 6.0% or more.

On the other hand, in a case where the volume percentage of the residual austenite is more than 12.0%, the hole expansibility of the hot-rolled steel sheet deteriorates. Therefore, the volume percentage of the residual austenite is set to 12.0% or less. The volume percentage of the residual austenite is preferably 10.0% or less or 9.0% or less.

Bainite: 75.0% or More and Less than 97.0%

Bainite is a structure having an excellent balance between ductility and hole expansibility while having a predetermined strength. First, in order to obtain a total elongation of 13.0% or more, it is necessary to set the volume percentage of the residual austenite to 3.0% or more and to set the volume percentage of the bainite must to less than 97.0%. Therefore, the volume percentage of the bainite is set to less than 97.0%. The volume percentage of the bainite is preferably 95.0% or less.

On the other hand, in a case where the volume percentage of the bainite is less than 75.0%, the homogeneity of the structure is lost, and the hole expansibility deteriorates. Therefore, the volume percentage of the bainite is set to 75.0% or more. The volume percentage of the bainite is preferably 80.0% or more.

Ferrite: 10.0% or Less

Ferrite is a structure that has high distortability and is effective for improving the ductility of the hot-rolled steel sheet; however, when the volume percentage is too large, the strength of the hot-rolled steel sheet decreases. When the volume percentage of the ferrite exceeds 10.0%, the strength of the hot-rolled steel sheet decreases, and the tensile strength becomes less than 1150 MPa. Therefore, the volume percentage of the ferrite is set to 10.0% or less. The volume percentage of the ferrite is preferably 6.0% or less. The lower limit of the volume percentage of the ferrite is not particularly limited and may be 0%.

Martensite: 10.0% or Less

Martensite has an effect on increasing the strength, but has low local distortability, and an increase in the volume percentage degrades the local elongation and hole expansibility of the hot-rolled steel sheet. When the volume percentage of the martensite exceeds 10.0%, the hole expansion rate of the hot-rolled steel sheet becomes less than 35.0%. Therefore, the volume percentage of the martensite is set to 10.0% or less. The volume percentage of the martensite is preferably 6.0% or less. The lower limit of the volume percentage of the martensite is not particularly limited and may be 0%.

Pearlite: 3.0% or Less

Pearlite is a structure that degrades the hole expansibility of the hot-rolled steel sheet. When the volume percentage of the pearlite exceeds 3.0%, the hole expansion rate of the hot-rolled steel sheet becomes less than 35.0%. Therefore, the volume percentage of the pearlite is set to 3.0% or less. The volume percentage of the pearlite is preferably 1.5% or less. The lower limit of the volume percentage of the pearlite is not particularly limited and may be 0%.

Measuring Method of Volume Percentage of Residual Austenite

The volume percentage of the residual austenite is measured by EBSP. Analysis by EBSP is performed at a ¼ position in the sheet thickness direction from the surface of the hot-rolled steel sheet (a region from a ⅛ depth in the sheet thickness direction from the surface to a ⅜ depth in the sheet thickness direction from the surface) and at a ½ position in the sheet thickness direction from the surface (a region from the ⅜ depth in the sheet thickness direction from the surface to a ⅝ depth in the sheet thickness direction from the surface). A sample needs to be polished using silicon carbide paper #600 to #1000, then, finished into a mirror surface using a liquid containing a diamond powder having grain sizes of 1 to 6 µm dispersed in a diluted solution such as an alcohol or pure water, and then finished by electrolytic polishing for the purpose of sufficiently removing strain in a cross section to be measured. The electrolytic polishing is performed using a liquid mixture of ethanol perchlorate at a liquid temperature of −80° C. Here, the voltage during the electrolytic polishing needs to be adjusted such that the thickness of a polished layer on the surface layer becomes constant and a defect attributed to the polishing such as a pit is not caused.

In the measurement by EBSP, the accelerating voltage is set to 15 to 25 kV, the measurement is performed at intervals of at least 0.25 µm or less, and the crystal orientation information at each measurement point in a range that is 150 µm or more in the sheet thickness direction and 250 µm or more in a rolling direction is obtained. Out of the obtained crystal structures, grains having an fcc crystal structure are determined as the residual austenite using a "Phase Map" function installed in software "OIM Analysis (registered trademark)" included in an EBSP analyzer. The ratio of measurement points determined as the residual austenite is obtained, thereby obtaining the area ratio of the residual austenite. The obtained area ratio of the residual austenite is regarded as the volume percentage of the residual austenite.

Here, the larger the number of the measurement points, the more preferable, and thus it is preferable that the measurement intervals are narrow and the measurement range is wide. However, in a case where the measurement intervals are less than 0.01 µm, adjacent points interfere with the spreading width of an electron beam. Therefore, the measurement intervals are set to 0.01 µm or more. In addition, the measurement range needs to be set to 200 µm in the sheet thickness direction and 400 µm in the rolling direction at a maximum. In addition, in the measurement, an instrument including athermal field emission-type scanning electron microscope (JSM-7001F manufactured by JEOL Ltd.) and an EBSD detector (DVC 5-type detector manufactured by TSL) is used. At this time, the degree of vacuum in the instrument is set to $9.6 \times 10^{-5}$ Pa or less, the irradiation current level is set to 13, and the irradiation level of the electron beam is set to 62.

Measuring Method of Volume Percentage of Ferrite

As the volume percentage of the ferrite, the area ratio of crystal grains in which an iron-based carbide is not formed, which are obtained by observing the structure on a metallographic structure photograph, is used. Additionally, the ferrite has a characteristic of the absence of subgrain boundaries or interfaces formed by transformation in the crystal grains, and crystal grains in which neither the iron-based carbide nor interfaces in the crystal grains are present are defined as ferrite grains. A sample is collected such that a sheet thickness cross section that intersects the rolling direction of the hot-rolled steel sheet at right angles can be observed, and the cross section is corroded for 10 to 15 seconds using ethanol and a nital etching solution adjusted to a concentration of 3% to 5% to make the ferrite visible. The structure is observed using metallographic structure photographs each captured at a magnification of 500 to 1000 times at the ¼ position in the sheet thickness direction from the surface of the hot-rolled steel sheet (the region from a ⅛ depth in the sheet thickness direction from the surface to the ⅜ depth in the sheet thickness direction from the surface) or at the ½ position in the sheet thickness direction from the surface (the region from the ⅜ depth in the sheet thickness direction from the surface to the ⅝ depth in the sheet thickness direction from the surface). An optical microscope is used to capture the structure photographs. The metallographic structure photographs are prepared at 3 or more visual fields in each of the ¼ position in the sheet thickness direction from the surface and the ½ position in the sheet thickness direction from the surface. The area ratio of the ferrite grains that are observed in each metallographic structure photograph is obtained, and the average value thereof is calculated, thereby obtaining the average value of the area ratios of the ferrite. This average value is regarded as the volume percentage of the ferrite.

The iron-based carbide is recognized as black granular contrast having a circle equivalent diameter of 1 µm or less and is observed in the crystal grain.

Measuring Method of Volume Percentage of Martensite

As the volume percentage of the martensite, the area ratio of martensite identified from metallographic structure photographs is used. A sample is collected such that a sheet thickness cross section that intersects the rolling direction of the hot-rolled steel sheet at right angles can be observed, and the structure is observed using metallographic structure photographs each captured at a magnification of 500 to 1000 times at the ¼ position in the sheet thickness direction from the surface of the hot-rolled steel sheet (the region from a ⅛ depth in the sheet thickness direction from the surface to the ⅜ depth in the sheet thickness direction from the surface) or at the ½ position in the sheet thickness direction from the surface (the region from the ⅜ depth in the sheet thickness direction from the surface to the ⅝ depth in the sheet thickness direction from the surface). The metallographic structure is corroded using a LePera etching solution containing picric acid, sodium sulfite, and ethanol mixed therewith at a liquid temperature of 60° C. to 80° C. for 30 to 60 seconds and is thereby made visible. Massive structures that are observed as white contrast in the captured structure photographs are the mixed structures of the martensite and the residual austenite. The area ratio of the mixed structures of martensite and residual austenite is regarded as the total volume percentage of the martensite and the residual austenite. A value obtained by subtracting the volume percentage of the residual austenite measured by the above-described method from the total volume percentage of the martensite and the residual austenite is regarded as the volume percentage of the martensite.

Measuring Method of Volume Percentage of Pearlite

As the volume percentage of the pearlite, the area ratio of lamella structures which are obtained by observing the structure on a metallographic structure photograph, is used. As the metallographic structure photograph, the same photograph used for measuring the volume percentage of the ferrite may be used. The area ratio of pearlite identified from this metallographic structure photograph is regarded as the volume percentage of the pearlite.

Measuring Method of Volume Percentage of Bainite

As the volume percentage of the bainite, a value obtained by subtracting the total of the volume percentages of the residual austenite, the ferrite, the martensite, and the pearlite measured by the above-described methods from 100% is used.

Average Grain Diameter of Prior Austenite Grains: 25.0 μm or Less

As described above, the depths of recessed parts in the forming-damaged portion are formed by the development of unevenness by plastic uplifts on the surface of the steel sheet and contact with a die under bent or bent and bent back distortion. Between these, the degree of the plastic uplifts on the surface of the steel sheet depends on the magnitude of an effective grain size in the surface layer of the steel sheet. In the configuration of the metallographic structure, the effective grain size corresponds to the average grain diameter of the prior austenite grains, and a prior austenite grain boundary acts as the largest distortion unit. In a case where the average grain diameter of the prior austenite grains exceeds 25.0 μm, the depths of the recessed parts in the forming-damaged portion becomes deep, and the fatigue properties of the hot-rolled steel sheet in the forming-damaged portion deteriorate. Therefore, the average grain diameter of the prior austenite grains in a surface layer region (a region from the surface to a 100 μm position in the sheet thickness direction from the surface) is set to 25.0 μm or less. The grain diameter of the prior austenite grains is preferably 20.0 μm or less or 15.0 μm or less.

The average grain diameter of the prior austenite grains is preferably as small as possible, but may be 3.0 μm or more since an extremely high rolling load becomes necessary to set the average grain diameter to less than 3.0 μm.

Measuring Method of Average Grain Diameter of Prior Austenite Grains

In order to measure the average grain diameter of the prior austenite grains, a sample is collected such that a sheet thickness cross section that intersects the rolling direction of the hot-rolled steel sheet at right angles can be observed, and the sample is used after the structure on the sheet thickness cross section is made visible with a saturated aqueous solution of picric acid and an etching solution of sodium dodecylbenzene sulfonate. In a surface layer region (a region from the surface to a 100 μm position in the sheet thickness direction from the surface) of this sample, the circle equivalent diameters of the prior austenite grains are measured using a structure photograph captured at a magnification of 500 times using a scanning electron microscope. The scanning electron microscope needs to be equipped with a two-electron detector. Regarding the capturing of the structure photograph, the sample is irradiated with an electron beam in a vacuum at $9.6 \times 10^{-5}$ Pa or less, an accelerating voltage of 15 kV, and an irradiation current level of 13, and a secondary electron image of the surface layer region (the region from the surface of the hot-rolled steel sheet to the 100 μm position in the sheet thickness direction from the surface) is captured. The number of visual fields captured is set to 10 or more visual fields. In the captured secondary electron image, the prior austenite grain boundaries are captured as bright contrast. The circle equivalent diameter is calculated for one of the prior austenite grains that is included in the observed visual field. The above-described operation is performed on all of the prior austenite grains that are included in the observed visual field except for prior austenite grains that are not fully included in the captured visual field, such as prior austenite grains in the end portion of the captured visual field, and the circle equivalent diameters of all of the prior austenite grains in the captured visual field are obtained. The average grain diameter of the prior austenite grains is obtained by calculating the average value of the circle equivalent diameters of the prior austenite grains obtained in the individual captured visual fields.

Ratio between maximum depth of region where, on one surface, rotation angle between normal line of one surface and (011) pole near normal line of one surface is 5° or less and maximum depth of region where, on the other surface, rotation angle between normal line of the other surface and (011) pole near normal line of the other surface is 5° or less: 1.00 to 1.20

The recessed parts in the forming-damaged portion are formed by the development of unevenness by the plastic deformation of the surface layer of the steel sheet and contact with a die during forming. From this fact, the inventors found that the depths of the recessed parts depend on the unit of distortion of the surface layer of the steel sheet and can be reduced by the prior austenite grain sizes in high-strength steel. However, desired fatigue properties cannot be obtained in the forming-damaged portion by the control of the prior austenite grain size alone. Fatigue damage of a component progresses most in a standing wall and the flat portion of an R portion since high stress is initiated in a portion having the highest stiffness. This R portion undergoes bend or bend and bend back distortion such as hat forming. As a result of inventive studies, the inventors found that, even in a forming-damaged portion, desired fatigue properties can be obtained by the fact the maximum depths of regions where the rotation angle between the normal line of the surface and the (011) pole near the normal line of the surface is 5° or less differ on the front and back surfaces of the steel sheet and the depths of the recessed parts are obtained by the ratio between the maximum depths of the regions on the front and back surfaces of the steel sheet and the fact that the ratio is 1.00 to 1.20. Therefore, the ratio between the maximum depth of the region where the rotation angle between the normal line of one surface of the steel sheet and the (011) pole near the normal line of the one surface is 5° or less and the maximum depth of the region where, on the other surface, the rotation angle between the normal line of the other surface and the (011) pole near the normal line of the other surface is 5° or less (hereinafter, simply referred to as the ratio between the maximum depths in some cases) is set to 1.00 to 1.20. The ratio between the maximum depths is preferably 1.15 or less or 1.10 or less.

Hereinafter, a measuring method of the maximum depth of a region having a predetermined rotation angle between the normal line of one surface and the (011) pole near the normal line of the one surface will be described.

Measurement is performed by EBSP using a sample having a cross section finished into a mirror surface by the same method as for the sample used for the measurement of the volume percentage of the prior austenite grains. The sample needs to be finished by electrolytic polishing for the purpose of sufficiently removing strain in the cross section to be measured.

In the measurement by EBSP, the accelerating voltage is set to 15 to 25 kV, and the measurement range is set to a measurement range that covers the overall sheet thickness. The measurement range needs to be 1000 μm or more in the rolling direction. In addition, since the purpose is to measure the average characteristics of crystal orientations, the measurement intervals may be 5 μm or more. The measurement intervals are set to 25 μm or less in order to avoid an increase in the number of crystal grains that are not measured by mistake. Crystal orientation data need to be recorded along with the measurement coordinate system. From the obtained crystal orientation data, the rotation angle between the normal line of one surface of the steel sheet and the (011) pole near the normal line is measured by the following method.

The rotation angle between the normal line of one surface (front surface or back surface) of the hot-rolled steel sheet and the (011) pole near this normal line is a value that is measured by plotting the crystal orientation data obtained by the EBSP measurement on a positive pole figure. At the time of plotting the crystal orientations on the positive pole figure, in the coordinate system of the positive pole figure, poles of the (011) orientation are displayed such that normal lines (origin: ND) become the normal lines to the sheet surface of the hot-rolled steel sheet, the horizontal axis TD becomes the sheet width direction, and the axis RD orthogonal to the horizontal axis becomes the rolling direction. As described above, the crystal orientation is a group of points measured at predetermined intervals in a measurement range that is 1000 μm or more in the rolling direction and covers the overall sheet thickness range. This group of points is divided into 20 sections in the sheet thickness direction, and a (011) pole figure is drawn. In the (011) pole figure at each depth direction position from one surface of the hot-rolled steel sheet drawn as described above, the angle between the origin ND (normal line of one surface of the hot-rolled steel sheet) and the nearest (011) pole is measured. This measurement value is defined as the rotation angle between the normal line of one surface and the (011) pole near the normal line. At each depth direction position, the maximum depth of a region where the rotation angle becomes 5° or less is obtained.

The above-described operation is performed on the front surface and the back surface of the hot-rolled steel sheet, thereby obtaining the maximum depths of the regions having a predetermined rotation angle between the normal line of the surface and the (011) pole near the normal line of the surface on both surfaces of the hot-rolled steel sheet. A value is calculated by dividing the value of, between the front and back surfaces, one surface having a larger maximum depth by the value of the other surface, thereby obtaining the ratio between the maximum depth of the region where, on one surface, the rotation angle between the normal line of the one surface and the (011) pole near the normal line of the one surface is 5° or less and the maximum depth of the region where, on the other surface, the rotation angle between the normal line of the other surface and the (011) pole near the normal line of the other surface is 5° or less.

Tensile Strength: 1150 MPa or More

In the hot-rolled steel sheet according to the present embodiment, the tensile strength is 1150 MPa or more. When the tensile strength is less than 1150 MPa, automobile suspension components to which the present invention can be applied are limited. In a case where the tensile strength is intrinsically less than 1150 MPa, improvement in the fatigue properties in the forming-damaged portion is not considered as a problem. The tensile strength may be 1200 MPa or more or 1300 MPa or more. The tensile strength is preferably as high as possible, but may be 1500 MPa or less from the viewpoint of an effect on the weight reduction of components by the high-strengthening of the hot-rolled steel sheet.

The tensile strength is measured by performing a tensile test in accordance with JIS Z 2241: 2011 using a No. 5 test piece of JIS Z 2241: 2011. A position where the tensile test piece is collected is the central position in the sheet width direction, and a direction perpendicular to the rolling direction is the longitudinal direction.

Total Elongation: 13.0% or More

The total elongation needs to be 13.0% or more in order to prevent the occurrence of necking or fracture during the forming of flange portions, projected portions, and the like of automobile suspension components. Therefore, the total elongation may be 13.0% or more. The total elongation is preferably 14.0% or more. The total elongation refers to elongation at fracture in the tensile test for measuring the tensile strength.

Hole Expansion Rate: 35.0% or More

The hot-rolled steel sheet according to the present embodiment may have a hole expansion rate of 35.0% or more. When the hole expansion rate is less than 35.0%, since forming-induced fracture occurs at the end portion of a cylindrical burring portion, there is a case where it is not possible to apply the present invention to automobile suspension components. In order to further increase the forming height of the cylindrical burring portion, the hole expansion rate may be 50.0% or more.

The hole expansion rate is measured by performing a hole expansion test in accordance with JIS Z 2256: 2010.

Fatigue Strength of Forming-Damaged Portion: 350 MPa or More

For 780 MPa class steel sheets that are currently applied, the fatigue strength attributed to the recessed parts in the forming-damaged portion is not considered as a problem, and the fatigue limit ratio becomes 0.45 or more. In the hot-rolled steel sheet according to the present embodiment, even when there is a recessed part in the forming-damaged portion, it is necessary to obtain the same fatigue strength as those of 780 MPa class steel sheets, and thus the fatigue strength of the forming-damaged portion is preferably 350 MPa or more. When the fatigue strength of the forming-damaged portion is 350 MPa or more, the hot-rolled steel sheet can be regarded as being excellent in terms of the fatigue strength in the forming-damaged portion.

The fatigue limit ratio is a value obtained by dividing the fatigue strength by the tensile strength (fatigue strength/ tensile strength).

The fatigue properties of the recessed part in the forming-damaged portion are evaluated by performing hat forming on a strip-shaped hot-rolled steel sheet and measuring the fatigue strength using a plane bending fatigue test piece produced from the formed hot-rolled steel sheet. In hat forming, when a standing wall is formed, the hot-rolled steel sheet comes into contact with a punch while being bent and bent back-distorted, and thus it is possible to reproduce recessed parts that are formed in a flat-R portion near the standing wall portion of a suspension component. For the strip-shaped hot-rolled steel sheet that is used for the hat forming, the sizes are set to a width of 35 mm and a length of 400 mm with the longitudinal direction as the L direction. The hat forming is performed on this strip-shaped hot-rolled steel sheet using a square head punch with approximately R6. In a forming test, a model 145-100 manufactured by Erichsen, Inc. is used. From the standing wall of a formed hat test piece, a test piece having a shape in accordance with JIS Z 2275: 1978 is produced, and a fatigue test is performed. As fatigue test conditions, at room temperature, the stress ratio R is set to −1, the frequency is set to 25 Hz, the load is repeatedly applied up to $10^6$ times, and the number of times of repetition at fracture is measured. Stress at which the test piece does not fracture until the $10^6$th application of the load is regarded as the fatigue strength.

The hot-rolled steel sheet according to the present embodiment having the above-described chemical composition and metallographic structure may be provided with a plating layer on the surface for the purpose of improving corrosion resistance and the like and thereby made into a surface-treated steel sheet. The plating layer may be an electro plating layer or a hot-dip plating layer. As the electro plating layer, electrogalvanizing, electro Zn—Ni alloy plating, and the like are exemplary examples. As the hot-dip plating layer, hot-dip galvanizing, hot-dip galvannealing, hot-dip aluminizing, hot-dip Zn—Al alloy plating, hot-dip Zn—Al—Mg alloy plating, hot-dip Zn—Al—Mg—Si alloy plating, and the like are exemplary examples. The plating adhesion amount is not particularly limited and may be the same as before. In addition, it is also possible to further enhance the corrosion resistance by performing an appropriate chemical conversion treatment (for example, the application and drying of a silicate-based chromium-free chemical conversion treatment liquid) after plating.

Next, a preferable manufacturing method of the hot-rolled steel sheet according to the present embodiment will be described. A casting step and a hot rolling step to be described below are necessary requirements for reducing the depths of the recessed parts in the forming-damaged portion and are important steps to control crystal orientations in the sheet thickness direction and the average grain diameter of the prior austenite grains.

The preferable manufacturing method of the hot-rolled steel sheet according to the present embodiment includes the following steps.

A continuous casting step of, in continuous casting of a slab having a predetermined chemical composition, performing the continuous casting in a manner that the average cooling rate gradient of the surface temperature in a region from the meniscus to 1.0 m from the meniscus becomes 0.20 to 15.00° C./s² to obtain the slab, a heating step of heating the slab to 1200° C. or higher, a hot rolling step of performing rough rolling of the slab after the heating, and then performing finish rolling in a manner that the total rolling reduction in a temperature range of 870° C. to 980° C. becomes 80% or larger and the elapsed time between rolling stands becomes 4.00 seconds or shorter in the temperature range of 870° C. to 980° C., a cooling step of cooling a hot-rolled steel sheet to a temperature range of 300° C. to 550° C., and a coiling step of, after the cooling, coiling the hot-rolled steel sheet in a manner that the coiling temperature is in the temperature range of 300° C. to 550° C.

Hereinafter, each step will be described.

Continuous Casting Step

In the continuous casting of a slab having the above-described chemical composition, the average cooling rate gradient of the surface temperature in a region from the meniscus to 1.0 m from the meniscus is set to 0.20 to 15.00° C./s². In the present embodiment, the average cooling rate gradient of the surface temperature refers to a change of the cooling rate over time within a range of 1.0 m from the meniscus. This average cooling rate gradient can be calculated based on temperature data that are obtained at positions 0.1 m, 0.5 m, and 1.0 m distant from the meniscus with a thermometer embedded in a mold copper sheet. At a certain time, the temperature measurement values at the positions 0.1 m, 0.5 m, and 1.0 m distant from the meniscus are represented by $T_{0.1}$, $T_{0.5}$, and $T_{1.0}$. In a case where a time when a solidified shell is present at the position 0.1 m from the meniscus is represented by $t_{0.1}$, a time when the solidified shell passes through the position 0.5 m from the meniscus becomes $t_{0.5}=(t_{0.1}+0.4/V)$ where the casting velocity is represented by V (m/sec). Similarly, a time when the solidified shell passes through the position 1.0 m from the meniscus becomes $t_{1.0}=(t_{0.1}+0.9/V)$. The cooling rate gradient within the range of 1.0 m from the meniscus expressed using $t_{0.1}$, $t_{0.5}$, and $t_{1.0}$ having the above-described relationship and the temperature measurement values $T_{0.1}$, $T_{0.5}$ and $T_{1.0}$ at the individual positions becomes $(4/9) \times V^2 \times T_{1.0} + (5/9) \times V^2 \times T_{0.1} - (1.62/1.25) \times V^2 \times T_{0.5}$.

Cooling rate gradients on the front and back surfaces of the slab at a certain arbitrary time between the start to the end of the continuous casting of target steel are obtained, and the average value thereof is regarded as the cooling rate gradient at that time. The cooling rate gradients at this certain time are measured in at least 20 points, and the average value thereof is regarded as the average cooling rate gradient of the surface temperature in the region from the meniscus to 1.0 m from the meniscus. The cooling rate gradients may be measured at a maximum of 100 points.

The cooling rate of the surface temperature affects the growth of columnar crystals in the early stage of solidification, and the gradient thereof affects the frequency of formation of columnar crystal colonies in the surface layer. When the average cooling rate gradient of the surface temperature in the region from the meniscus to 1.0 m from the meniscus is faster than 15.00° C./s², the ratio between the maximum depths exceeds 1.20. The average cooling rate gradient in the region is preferably as slow as possible; however, when the average cooling rate gradient is slower than 0.20° C./s² cooling control becomes extremely difficult, and thus the average cooling rate gradient is preferably 0.20° C./s² or faster.

The average casting velocity in the continuous casting step may be in an ordinary range, may be 0.8 m/min or faster, or may be 1.2 m/min or faster. From the viewpoint of cost reduction, the average casting velocity is preferably set to 1.2 m/min or faster. On the other hand, when the average casting velocity is faster than 2.5 m/min, a defect is likely to be initiated in the slab in a solidification process. Therefore, the average casting velocity is preferably 2.5 m/min or slower. In addition, when the average casting velocity is slower than 0.6 m/min, the cooling temperature gradient in the slab thickness direction decreases, but the economic efficiency is significantly impaired. Therefore, the average casting velocity is preferably 0.6 to 2.5 m/min. The cooling temperature gradient mentioned here is different from the above-described average cooling rate gradient.

Heating Step

The slab obtained by continuous casting is heated such that the surface temperature becomes 1200° C. or higher and is solutionized. In a case where the slab contains Ti, the heating temperature is preferably set to 1230° C. or higher in order to more reliably form a solid solution of Ti. In addition, regarding the slab temperature before heating, the slab may be cooled to room temperature or may remain at a high temperature after the continuous casting in a case where there is a concern of cracking caused by thermal stress or the like. The slab is heated in the heating step by charging the slab into a furnace controlled to a predetermined temperature, and a time taken for the slab surface temperature to become 1200° C. or higher (holding time) needs to be set to 30 minutes or longer, which is sufficient. In addition, in a case where the slab contains Ti, a time taken for the heating temperature to become 1230° C. or higher (holding time) needs to be set to 30 minutes or longer, which is sufficient. The upper limit of the holding time needs to be set to 300 minutes or shorter. In the furnace, the slab is disposed on an inorganic substance skid, and the slab may be solutionized by being heated to equal to or lower than a temperature at which the slab heated by a reaction between the inorganic substance and iron at this time does not dissolve. For example, the heating temperature needs to be set to 1400° C. or lower.

Hot Rolling Step

After the slab is heated, rough rolling is performed, and then finish rolling is performed within a range to be described below. The finish rolling is performed such that the total rolling reduction within a temperature range of 870° C. to 980° C. becomes 80% or more. When the finish rolling temperature is higher than 980° C., the average grain diameter of the austenite grains becomes large regardless of the total rolling reduction at the rolling stand, it is not possible to reduce the depths of the recessed parts in the forming-damaged portion, and excellent fatigue properties cannot be obtained in the forming-damaged portion.

In a case where the total rolling reduction within the temperature range of 870° C. to 980° C. is less than 80%, the average grain diameter of the prior austenite grains exceeds 25.0 µm. The total rolling reduction mentioned herein is a value obtained by adding the rolling reduction at each rolling stand where the biting temperature becomes 870° C. to 980° C. The upper limit of the total rolling reduction within the temperature range of 870° C. to 980° C. may be set to 95% or less.

In addition, in the hot rolling step, when the total sheet reduction rate $((1-t/t_0)\times 100)$, which is the ratio between a sheet thickness to after the rough rolling and a product sheet thickness t after the finish rolling, is less than 80%, it is not possible to obtain a total rolling reduction within the temperature range of 870° C. to 980° C. of 80% or more regardless of the control of the rolling temperature, and thus the total sheet reduction rate is limited to 80% or more. This total sheet reduction rate is preferably as high as possible since the yield increases; however, in a case where the total sheet reduction rate exceeds 98%, the load on a rolling machine increases, and costs for roll replacement and the like increase. In consideration of the load on the roll, the total sheet reduction rate is more desirably 95% or less. Therefore, the total sheet reduction rate, which is the ratio between the sheet thickness after the rough rolling and the product sheet thickness after the finish rolling, is limited to 80% or more. In addition, the total sheet reduction rate is desirably 98% or less.

The number of all rolling stands is not particularly limited and may be determined depending on the capacity, such as load capacity or torque, of the rolling machine. Ordinarily, the number of rolling stands where the biting temperature becomes 870° C. to 980° C. is 2 stands or more. In the finish rolling within the temperature range of 870° C. to 980° C., in a case where the elapsed time between the rolling stands exceeds 4.00 seconds, austenite grains grow in the corresponding section, and the average grain diameter of the prior austenite grains becomes more than 25.0 µm, which is not preferable. Therefore, in a case where the number of rolling stands where the biting temperature becomes 870° C. to 980° C. exceeds 2 stands, the elapsed time between the rolling stands is set to 4.00 seconds or shorter. In a case where the elapsed time between the rolling stands is shorter than 0.30 seconds, the load on the rolling roll increases, and thus the elapsed time may be set to 0.30 seconds or longer.

The biting temperature may be obtained from the surface temperature of the steel sheet measured with a thermometer such as a radiation-type thermometer installed in each stand.

Cooling Step

After the finish rolling, the hot-rolled steel sheet is cooled to a temperature range of 350° C. to 550° C. When the cooling stop temperature after the finish rolling is outside the temperature range of 330° C. to 550° C., it is not possible to perform coiling, which will be described below, in a desired temperature range.

Coiling Step

After the cooling, the hot-rolled steel sheet is coiled in a manner that the coiling temperature falls into a temperature range of 350° C. to 550° C. in order to obtain a strength of the hot-rolled steel sheet of 1150 MPa or more. When the coiling temperature is lower than 350° C., the volume percentage of the martensite increases. Therefore, the coiling temperature is set to 350° C. or higher. The coiling temperature is preferably 380° C. or higher. On the other hand, when the coiling temperature is higher than 550° C., the volume percentage of the bainite decreases, and furthermore, when the coiling temperature is 570° C. or higher, the volume percentage of the ferrite increases. Therefore, the coiling temperature is set to 550° C. or lower. The coiling temperature is preferably 480° C. or lower.

As the coiling temperature, the average value of the surface temperatures of the steel sheet throughout the entire length of a coil measured throughout the entire length of the coil with a thermometer installed in a section from the cooling apparatus to a coiling machine after the cooling may be used. This is because the average value of the surface temperatures of the steel sheet throughout the entire length of the coil is equivalent to the coil temperature after the hot-rolled steel sheet is coiled into a coil shape. In order to reduce a material variation in the coil, the coiling temperature at an arbitrary point of the coil is preferably set to a maximum of 480° C. or lower. That is, the surface temperature of the steel sheet is preferably set to 480° C. or lower throughout the entire length of the coil.

In the present embodiment, the elapsed time from the start of the cooling in the cooling step to the start of the coiling in the coiling step is preferably set to 30 seconds or shorter. The elapsed time mentioned herein is a time taken from the completion of the finish rolling to the start of the coiling. In the chemical composition of the hot-rolled steel sheet according to the present embodiment, the cooling time is not particularly limited; however, when the cooling time is long, the length of an air cooling zone in a cooling zone becomes long, and the scale thickness on the surface layer becomes thick, which increase cost in a pickling step. Therefore, the cooling time is preferably 30 seconds or shorter. In the cooling step, the elapsed time from the start of the cooling to the start of the coiling may be adjusted by adjusting the average cooling rate of the cooling in the cooling step. As a cooling method after the finish rolling, a cooling method such as water cooling or air cooling on a run-out table may be selected such that the cooling time becomes as desired.

The hot-rolled steel sheet manufactured by the above-described method may be left to be cooled to room temperature or may be cooled with water after coiled into a coil shape. In the case of having been cooled to room temperature, the hot-rolled steel sheet may be uncoiled again and pickled or may be subjected to skin pass rolling for adjusting residual stress or the shape.

Tempering Step

The preferable manufacturing method of a hot-rolled steel sheet according to the present embodiment may further include a tempering step of tempering the hot-rolled steel sheet manufactured by the above-described steps in order to further improve the ductility.

In the case of performing tempering, the tempering is preferably performed under conditions where the hot-rolled steel sheet is held in a temperature range of 200° C. or higher and lower than 450° C. for 90 to 80000 seconds. When the tempering temperature is lower than 200° C., a change in the material quality is rarely recognized, and the manufacturing cost increases due to an increase in the number of the steps, which is not preferable. In addition, when the tempering temperature is 450° C. or higher, the pearlite fraction exceeds 3.0%, and thus the hole expansibility deteriorates. The average temperature increase velocity in the tempering step is not particularly limited, but is preferably 0.01° C./sec or faster in order to prevent a decrease in the heat treatment efficiency. In addition, the atmosphere during the tempering may be an oxidizing atmosphere or an atmosphere substituted with N or the like. Tempering may be performed on the coil-shaped hot-rolled steel sheet; however, in this case, the holding time is preferably set to 1000 seconds or longer in order to reduce a variation in the coil. The tempered hot-rolled steel sheet may be cooled to room temperature and then pickled in order to remove a scale formed by the hot rolling or a heat treatment if necessary.

Plating Step

The preferable manufacturing method of a hot-rolled steel sheet according to the present embodiment may further include a plating step of performing a hot-dip galvanizing treatment on the hot-rolled steel sheet manufactured by the above-described method or the hot-rolled steel sheet after the tempering step.

In the case of performing the hot-dip galvanizing treatment, it is preferable to set the highest temperature within a temperature range of 450° C. to 495° C. and set the residence time in this temperature range to 75 seconds or shorter. The residence time at lower than 450° C. is preferably set to, similar to that in the tempering step, a residence time of 90 to 80000 seconds in the temperature range of 200° C. or higher and lower than 450° C. When the highest temperature is higher than 495° C., the volume percentage of the residual austenite becomes less than 3.0% regardless of the residence time, and the ductility of the hot-rolled steel sheet after plating deteriorates. When the highest temperature is lower than 450° C., a defect is initiated in a plating layer, which is not preferable. In a case where the other conditions are within the range of the above-described temperature history, a plating method is not particularly limited. The plating adhesion amount is not particularly limited and may be the same as before. In addition, it is also possible to further enhance the corrosion resistance by performing an appropriate chemical conversion treatment (for example, the application and drying of a silicate-based chromium-free chemical conversion treatment liquid) after the plating.

EXAMPLES

Slabs having a chemical composition shown in Table 1 were manufactured by continuous casting. As the conditions for the continuous casting, conditions shown in Table 2-1 and Table 2-2 were adopted. In the continuous casting, the average cooling rate gradient of the surface temperature in a region from the meniscus to 1.0 m from the meniscus exceeded 15.00° C./sec$^2$ in Test Nos. 4, 5, 10, 13, and 19.

From the obtained slabs, hot-rolled steel sheets having a sheet thickness of 2.6 mm were manufactured under the conditions shown in Table 2-1 and Table 2-2. If necessary, tempering and a plating treatment were performed under the conditions shown in Table 2-1 and Table 2-2. In cooling after hot rolling, the temperatures were cooled to coiling temperatures shown in Table 2-1 and Table 2-2. In addition, the elapsed times from the start of the cooling in a cooling step to the start of coiling in a coiling step were 30 seconds or shorter.

TABLE 1

| | Chemical composition (mass %), remainder is Fe and impurity | | | | | | | | | | | | | | |
|---|---|---|---|---|---|---|---|---|---|---|---|---|---|---|---|
| Steel | C | Si | Mn | Al | Nb | P | S | N | Ti | B | Mo | V | Cr | Ca | Note |
| A | 0.081 | 0.82 | 1.88 | 0.33 | 0.009 | 0.007 | 0.002 | 0.0032 | 0.021 | 0.0012 | | | | | Comparative steel |
| B | 0.113 | 0.83 | 1.83 | 0.32 | 0.006 | 0.008 | 0.002 | 0.0028 | 0.018 | 0.0011 | | | | | Present Invention Steel |
| C | 0.196 | 1.41 | 1.87 | 0.35 | 0.007 | 0.008 | 0.003 | 0.0027 | 0.017 | 0.0013 | | | | | Comparative steel |
| D | 0.156 | 1.34 | 2.40 | 0.21 | 0.011 | 0.007 | 0.002 | 0.0028 | 0.019 | 0.0016 | | | 0.005 | 0.006 | Present Invention Steel |
| E | 0.142 | 1.55 | 2.38 | 0.03 | 0.008 | 0.007 | 0.003 | 0.0028 | 0.019 | 0.0017 | | 0.008 | | 0.0002 | Comparative steel |
| F | 0.178 | 1.22 | 1.81 | 0.32 | 0.015 | 0.006 | 0.004 | 0.003 | 0.022 | 0.0014 | 0.003 | 0.006 | | | Present Invention Steel |
| G | 0.132 | 0.92 | 1.65 | 0.02 | 0.034 | 0.008 | 0.002 | 0.003 | 0.021 | 0.0006 | 0.005 | | | 0.0002 | Comparative steel |
| H | 0.134 | 0.93 | 3.15 | 0.03 | 0.035 | 0.006 | 0.003 | 0.0031 | 0.022 | 0.0007 | | | | | Comparative steel |
| I | 0.138 | 0.94 | 2.15 | 0.03 | 0.035 | 0.008 | 0.002 | 0.0033 | 0.007 | 0.0008 | | 0.006 | | | Present Invention Steel |
| J | 0.139 | 0.92 | 2.11 | 0.85 | 0.032 | 0.007 | 0.003 | 0.0031 | 0.008 | 0.0007 | | 0.004 | | | Comparative steel |
| K | 0.095 | 0.73 | 1.78 | 0.31 | 0.009 | 0.007 | 0.003 | 0.0029 | 0.006 | 0.001 | 0.003 | | | | Present Invention Steel |
| L | 0.161 | 0.64 | 2.61 | 0.51 | 0.025 | 0.008 | 0.002 | 0.0031 | 0.047 | 0.0011 | 0.004 | | | 0.0002 | Present Invention Steel |
| M | 0.176 | 1.23 | 1.80 | 0.33 | 0.053 | 0.008 | 0.003 | 0.0026 | 0.043 | 0.0019 | 0.003 | | | | Comparative steel |
| N | 0.143 | 1.18 | 1.86 | 0.38 | 0.015 | 0.007 | 0.002 | 0.0031 | 0.021 | 0.0003 | 0.003 | 0.004 | 0.006 | | Comparative steel |
| O | 0.172 | 0.34 | 2.33 | 0.03 | 0.022 | 0.006 | 0.002 | 0.0033 | 0.021 | 0.0022 | | | | | Comparative steel |
| P | 0.105 | 1.09 | 2.65 | 0.04 | 0.038 | 0.008 | 0.003 | 0.0035 | 0.021 | 0.0014 | | | | | Present Invention Steel |
| Q | 0.167 | 0.71 | 2.65 | 0.52 | 0.001 | 0.006 | 0.002 | 0.0024 | 0.031 | 0.0012 | 0.003 | | | 0.0002 | Comparative steel |
| R | 0.173 | 1.26 | 2.37 | 0.31 | 0.019 | 0.006 | 0.002 | 0.0031 | 0.018 | 0.0014 | 0.089 | 0.004 | 0.005 | | Present Invention Steel |
| S | 0.176 | 0.96 | 2.18 | 0.09 | 0.042 | 0.007 | 0.003 | 0.0021 | 0.132 | 0.0009 | | 0.153 | 0.006 | | Present Invention Steel |
| T | 0.181 | 1.33 | 2.45 | 0.06 | 0.013 | 0.008 | 0.003 | 0.0036 | 0.009 | 0.0013 | 0.003 | 0.004 | 0.410 | | Present Invention Steel |
| U | 0.108 | 1.13 | 2.63 | 0.03 | 0.035 | 0.006 | 0.002 | 0.0031 | 0.018 | 0.0011 | 0.005 | 0.004 | 0.006 | 0.0006 | Present Invention Steel |
| V | 0.114 | 0.78 | 2.29 | 0.02 | 0.022 | 0.073 | 0.004 | 0.0028 | 0.119 | 0.0022 | | | | | Present Invention Steel |

TABLE 1-continued

| Steel | Chemical composition (mass %), remainder is Fe and impurity ||||||||||||||  |
|---|---|---|---|---|---|---|---|---|---|---|---|---|---|---|
|  | C | Si | Mn | Al | Nb | P | S | N | Ti | B | Mo | V | Cr | Ca | Note |
| W | 0.118 | 0.76 | 2.31 | 0.03 | 0.018 | 0.008 | 0.008 | 0.0019 | 0.134 | 0.0019 |  |  |  |  | Present Invention Steel |
| X | 0.162 | 0.72 | 1.97 | 0.31 | 0.006 | 0.008 | 0.003 | 0.0023 | 0.175 | 0.0008 |  |  | 0.210 |  | Present Invention Steel |

Underlines indicate that the corresponding values are outside the scope of the present invention.

Blank cells indicate that the corresponding elements are not contained on purpose.

TABLE 2-1

| | | Continuous casting | Heating | | Hot rolling | | |
|---|---|---|---|---|---|---|---|
| | | Average cooling rate gradient of surface temperature in region | | | Total rolling reduction in temperature | Maximum elapsed time | Minimum elapsed time |
| Test No. | Steel | from meniscus to 1.0 m from meniscus ° C./sec² | Heating temperature ° C. | Holding time min | range of 870° C. to 980° C. % | between rolling stands sec | between rolling stands sec |
| 1 | B | 0.38 | 1246 | 243 | 84 | 3.03 | 0.45 |
| 2 | B | 3.66 | 1253 | 246 | 86 | 3.07 | 0.49 |
| 3 | B | 13.60 | 1248 | 250 | 84 | 3.04 | 0.48 |
| 4 | B | <u>15.80</u> | 1244 | 256 | 85 | 3.05 | 0.48 |
| 5 | B | <u>20.90</u> | 1248 | 251 | 84 | 3.09 | 0.48 |
| 6 | B | 8.90 | 1251 | 248 | 84 | 3.04 | 0.49 |
| 7 | D | 0.62 | 1276 | 221 | 84 | 2.76 | 0.37 |
| 8 | D | 4.83 | 1268 | 226 | 83 | 2.60 | 0.37 |
| 9 | D | 10.95 | 1270 | 227 | <u>76</u> | 2.63 | 0.33 |
| 10 | D | <u>16.30</u> | 1271 | 229 | <u>81</u> | 2.76 | 0.33 |
| 11 | F | <u>0.83</u> | 1231 | 253 | 83 | 3.92 | 0.49 |
| 12 | F | 13.90 | 1230 | 245 | 81 | 4.67 | 0.43 |
| 13 | F | <u>17.60</u> | 1236 | 229 | 87 | <u>3.82</u> | 0.45 |
| 14 | I | <u>8.90</u> | 1213 | 235 | 84 | 3.15 | 0.51 |
| 15 | I | 8.60 | 1208 | 250 | 86 | 3.21 | 0.52 |
| 16 | I | 8.80 | 1209 | 256 | 85 | 3.24 | 0.50 |
| 17 | L | 1.90 | 1278 | 228 | 82 | 3.33 | 0.37 |
| 18 | L | 2.90 | 1276 | 232 | 81 | 3.22 | 0.45 |
| 19 | L | <u>15.30</u> | 1251 | 248 | 81 | 3.26 | 0.32 |
| 20 | L | <u>14.40</u> | 1253 | 243 | 81 | 3.82 | 0.31 |

| Test No. | Coiling Coiling temperature ° C. | Tempering treatment temperature ° C. | Tempering treatment time sec | Plating Residence time at highest temperature and in temperature range of 450° C. to 495° C. | Note |
|---|---|---|---|---|---|
| 1 | 489 | N/A | N/A | N/A | Present Invention Example |
| 2 | 489 | N/A | N/A | N/A | Present Invention Example |
| 3 | 498 | N/A | N/A | N/A | Present Invention Example |
| 4 | 494 | N/A | N/A | N/A | Comparative Example |
| 5 | 491 | N/A | N/A | N/A | Comparative Example |
| 6 | 489 | N/A | N/A | N/A | Present Invention Example |
| 7 | <u>341</u> | N/A | N/A | N/A | Comparative Example |
| 8 | <u>362</u> | N/A | N/A | N/A | Present Invention Example |
| 9 | 371 | N/A | N/A | N/A | Comparative Example |
| 10 | 381 | N/A | N/A | N/A | Comparative Example |
| 11 | 512 | N/A | N/A | N/A | Present Invention Example |
| 12 | 516 | N/A | N/A | N/A | Comparative Example |
| 13 | 510 | N/A | N/A | N/A | Comparative Example |
| 14 | 541 | N/A | N/A | N/A | Present Invention Example |
| 15 | 570 | N/A | N/A | N/A | Comparative Example |
| 16 | <u>553</u> | N/A | N/A | N/A | Comparative Example |
| 17 | <u>528</u> | 430 | 96 | N/A | Present Invention Example |
| 18 | 531 | <u>456</u> | 96 | N/A | Comparative Example |
| 19 | 522 | <u>441</u> | 96 | N/A | Comparative Example |
| 20 | 526 | 426 | 96 | N/A | Present Invention Example |

Underlines indicate that manufacturing conditions are not preferable.

TABLE 2-2

| | | Continuous casting | Hot rolling | | | | |
|---|---|---|---|---|---|---|---|
| | | Average cooling rate gradient of surface temperature in region | Heating | | Total rolling reduction in temperature | Maximum elapsed time | Minimum elapsed time |
| Test No. | Steel | from meniscus to 1.0 m from meniscus ° C./sec² | Heating temperature ° C. | Holding time min | range of 870° C. to 980° C. % | between rolling stands sec | between rolling stands sec |
| 21 | K | 1.90 | 1235 | 260 | 89 | 3.02 | 0.49 |
| 22 | P | 8.81 | 1218 | 249 | 81 | 2.85 | 0.56 |
| 23 | R | 9.50 | 1214 | 240 | 82 | 3.55 | 0.51 |
| 24 | S | 5.70 | 1276 | 273 | 85 | 3.55 | 0.51 |
| 25 | T | 6.80 | 1221 | 257 | 82 | 3.47 | 0.53 |
| 26 | U | 6.20 | 1218 | 249 | 91 | 3.50 | 0.48 |
| 27 | T | 6.80 | 1221 | 257 | 82 | 3.47 | 0.53 |
| 28 | T | 6.80 | 1221 | 257 | 82 | 3.47 | 0.53 |
| 29 | A | 0.98 | 1228 | 239 | 93 | 3.17 | 0.50 |
| 30 | C | 9.56 | 1212 | 244 | 81 | 3.82 | 0.50 |
| 31 | E | 7.62 | 1203 | 255 | 86 | 2.86 | 0.57 |
| 32 | G | 7.40 | 1222 | 237 | 82 | 3.28 | 0.53 |
| 33 | H | Corner cracking and slab cracking | | | | | |
| 34 | J | Corner cracking and slab cracking | | | | | |
| 35 | M | Corner cracking and slab cracking | | | | | |
| 36 | N | 14.30 | N/A | 231 | 83 | 3.53 | 0.53 |
| 37 | O | 5.10 | N/A | 230 | 83 | 3.54 | 0.50 |
| 38 | Q | 7.80 | N/A | 249 | 84 | 3.61 | 0.50 |
| 39 | V | 5.56 | N/A | 270 | 86 | 3.50 | 0.43 |
| 40 | W | 5.83 | N/A | 288 | 83 | 3.61 | 0.46 |
| 41 | X | 7.27 | N/A | 291 | 81 | 3.87 | 0.55 |

| | | | Tempering | | Plating Residence time at | |
|---|---|---|---|---|---|---|
| Test No. | | Coiling Coiling temperature ° C. | Tempering treatment temperature ° C. | Tempering treatment time sec | highest temperature and in temperature range of 450° C. to 495° C. | Note |
| 21 | | 388 | N/A | N/A | N/A | Present Invention Example |
| 22 | | 384 | N/A | N/A | N/A | Present Invention Example |
| 23 | | 396 | 216 | 119 | N/A | Present Invention Example |
| 24 | | 473 | N/A | N/A | N/A | Present Invention Example |
| 25 | | 421 | 373 | 42480 | N/A | Present Invention Example |
| 26 | | 389 | N/A | N/A | N/A | Present Invention Example |
| 27 | | 421 | N/A | N/A | 475° C.-71 sec | Present Invention Example |
| 28 | | 421 | N/A | N/A | 497° C.-70 sec | Comparative Example |
| 29 | | 403 | N/A | N/A | N/A | Comparative Example |
| 30 | | 382 | N/A | N/A | N/A | Comparative Example |
| 31 | | 412 | N/A | N/A | N/A | Comparative Example |
| 32 | | 386 | N/A | N/A | N/A | Comparative Example |
| 33 | | Corner cracking and slab cracking | | | N/A | Comparative Example |
| 34 | | Corner cracking and slab cracking | | | N/A | Comparative Example |
| 35 | | Corner cracking and slab cracking | | | N/A | Comparative Example |
| 36 | | 529 | N/A | N/A | N/A | Comparative Example |
| 37 | | 530 | N/A | N/A | N/A | Comparative Example |
| 38 | | 491 | N/A | N/A | N/A | Comparative Example |
| 39 | | 481 | N/A | N/A | N/A | Present Invention Example |
| 40 | | 511 | N/A | N/A | N/A | Present Invention Example |
| 41 | | 488 | N/A | N/A | N/A | Present Invention Example |

Underlines indicate that manufacturing conditions are not preferable.

TABLE 3-1

| | | ¼ position and ½ position | | | | | | Region from surface to 100 µm position | |
|---|---|---|---|---|---|---|---|---|---|
| Test No. | Steel | Residual γ volume % | Bainite volume % | Ferrite volume % | Martensite volume % | Pearlite volume % | Prior γ grain diameter µm | Ratio between front and back surfaces of maximum depths of regions where rotation angle between normal line of surface and (011) pole near normal line is 5° or less | |
| 1 | B | 6.9 | 86.8 | 3.0 | 2.6 | 0.7 | 18.9 | 1.13 | |
| 2 | B | 8.0 | 85.5 | 3.4 | 2.3 | 0.8 | 12.3 | 1.08 | |

TABLE 3-1-continued

| Test No. | Steel | | | | | | | |
|---|---|---|---|---|---|---|---|---|
| 3 | B | 6.2 | 87.9 | 2.6 | 2.5 | 0.8 | 17.8 | 1.14 |
| 4 | B | 8.3 | 86.9 | 1.8 | 2.4 | 0.6 | 13.1 | <u>1.26</u> |
| <u>5</u> | B | 6.6 | 86.6 | 3.4 | 2.7 | 0.7 | 19.3 | <u>1.39</u> |
| 6 | B | 7.1 | 86.9 | 3.2 | 2.2 | 0.6 | 18.2 | <u>1.04</u> |
| 7 | D | 6.8 | <u>74.9</u> | 0.0 | <u>18.3</u> | 0.0 | 16.9 | 1.03 |
| <u>8</u> | D | 9.9 | <u>82.3</u> | 0.2 | <u>7.6</u> | 0.0 | 17.4 | 1.08 |
| 9 | D | 8.1 | 85.1 | 0.0 | 6.8 | 0.0 | <u>26.8</u> | 1.02 |
| <u>10</u> | D | 9.3 | 82.8 | 0.8 | 7.1 | 0.0 | <u>18.6</u> | <u>1.31</u> |
| 11 | F | 7.2 | 84.4 | 1.3 | 6.3 | 0.8 | 19.8 | <u>1.13</u> |
| 12 | F | 6.2 | 86.8 | 0.0 | 6.4 | 0.6 | <u>27.6</u> | 1.06 |
| <u>13</u> | F | 8.1 | 83.3 | 1.2 | 6.8 | 0.6 | <u>14.5</u> | <u>1.41</u> |
| 14 | I | 7.2 | 75.6 | 8.1 | 7.9 | 1.2 | 8.4 | <u>1.01</u> |
| 15 | I | 5.4 | <u>74.2</u> | 10.9 | 8.1 | 1.4 | 7.2 | 1.03 |
| 16 | I | 6.6 | <u>73.6</u> | 9.2 | 8.5 | 2.1 | 6.6 | 1.08 |
| 17 | L | 8.3 | <u>81.3</u> | 2.0 | 6.8 | 1.6 | 11.3 | 1.12 |
| 18 | L | 4.2 | 85.1 | 0.0 | 6.4 | <u>4.4</u> | 12.9 | 1.13 |
| <u>19</u> | L | 7.6 | 84.3 | 1.1 | 5.9 | <u>1.1</u> | 12.8 | <u>1.21</u> |
| <u>20</u> | L | 7.0 | 82.9 | 2.1 | 6.7 | 1.3 | 17.9 | <u>1.19</u> |

| | Mechanical characteristics | | | | |
|---|---|---|---|---|---|
| Test No. | Tensile strength MPa | Total elongation % | Hole expansion rate % | Fatigue strength of forming-damaged portion MPa | Note |
| 1 | 1162 | 13.4 | 40.6 | 386 | Present Invention Example |
| 2 | 1173 | 13.6 | 43.2 | 413 | Present Invention Example |
| 3 | 1154 | 13.2 | 45.6 | 372 | Present Invention Example |
| 4 | 1159 | 13.1 | 40.2 | <u>330</u> | Comparative Example |
| <u>5</u> | 1156 | 13.6 | 38.9 | <u>304</u> | Comparative Example |
| 6 | 1181 | 13.7 | 44.1 | <u>422</u> | Present Invention Example |
| 7 | 1321 | 13.2 | <u>20.3</u> | 396 | Comparative Example |
| <u>8</u> | 1221 | 14.3 | <u>36.8</u> | 388 | Present Invention Example |
| 9 | 1204 | 14.1 | 41.3 | <u>342</u> | Comparative Example |
| <u>10</u> | 1208 | 15.2 | 38.8 | <u>333</u> | Comparative Example |
| 11 | 1175 | 13.6 | 36.3 | 366 | Present Invention Example |
| 12 | 1162 | 14.2 | 38.3 | <u>332</u> | Comparative Example |
| <u>13</u> | 1189 | 14.6 | 37.6 | <u>274</u> | Comparative Example |
| 14 | 1163 | 13.7 | 37.0 | <u>443</u> | Present Invention Example |
| 15 | 1132 | 14.8 | 34.3 | 412 | Comparative Example |
| <u>16</u> | <u>1152</u> | 14.3 | <u>32.7</u> | 400 | Comparative Example |
| <u>17</u> | 1183 | 14.6 | 48.3 | 376 | Present Invention Example |
| 18 | 1154 | 13.2 | <u>34.8</u> | 382 | Comparative Example |
| <u>19</u> | 1162 | 14.0 | <u>36.5</u> | <u>344</u> | Comparative Example |
| <u>20</u> | 1189 | 13.9 | 38.5 | <u>356</u> | Present Invention Example |

Underlines indicate that the corresponding values are outside the scope of the present invention, manufacturing conditions are not preferable, and characteristics are not preferable.

TABLE 3-2

| | | ¼ position and ½ position | | | | | | Region from surface to 100 μm position | |
|---|---|---|---|---|---|---|---|---|---|
| Test No. | Steel | Residual γ volume % | Bainite volume % | Ferrite volume % | Martensite volume % | Pearlite volume % | Prior γ grain diameter μm | Ratio between front and back surfaces of maximum depths of regions where rotation angle between normal line of surface and (011) pole near normal line is 5° or less | |
| 21 | K | 4.2 | 85.8 | 6.9 | 1.4 | 1.7 | 10.5 | 1.04 | |
| 22 | P | 8.5 | 83.7 | 0.0 | 7.8 | 0.0 | 9.7 | 1.02 | |
| 23 | R | 9.8 | 86.3 | 0.0 | 3.9 | 0.0 | 11.3 | 1.04 | |
| 24 | S | 11.3 | 80.1 | 0.9 | 6.9 | 0.8 | 6.2 | 1.03 | |
| 25 | T | 10.3 | 87.5 | 0.0 | 2.2 | 0.0 | 12.9 | 1.11 | |
| 26 | U | 7.7 | 86.9 | 1.3 | 3.3 | 0.8 | 5.3 | 1.10 | |
| 27 | T | 11.6 | 86.8 | 0.0 | 1.6 | 0.0 | 12.9 | 1.11 | |
| 28 | T | 7.2 | 87.0 | 0.0 | 1.3 | <u>4.5</u> | 12.9 | 1.11 | |
| 29 | <u>A</u> | <u>2.5</u> | 95.1 | 0.3 | 1.0 | <u>1.1</u> | 8.8 | 1.13 | |
| 30 | <u>C</u> | <u>13.4</u> | 77.5 | 0.0 | 9.1 | 0.0 | <u>23.2</u> | 1.07 | |
| 31 | <u>E</u> | <u>12.6</u> | 78.5 | 0.8 | 7.8 | 0.3 | 16.8 | 1.05 | |
| 32 | <u>G</u> | <u>4.6</u> | 77.9 | <u>15.6</u> | 0.8 | 1.1 | 7.6 | 1.05 | |
| <u>33</u> | <u>H</u> | Corner cracking and slab cracking | | | | | | | |
| <u>34</u> | <u>J</u> | Corner cracking and slab cracking | | | | | | | |
| <u>35</u> | <u>M</u> | Corner cracking and slab cracking | | | | | | | |
| <u>36</u> | <u>N</u> | 4.6 | 71.6 | <u>20.6</u> | 1.8 | 1.4 | 10.6 | 1.15 | |
| 37 | <u>O</u> | <u>2.7</u> | 88.7 | <u>0.3</u> | 1.2 | <u>7.1</u> | 8.9 | 1.11 | |

TABLE 3-2-continued

| | | | | | | | | |
|---|---|---|---|---|---|---|---|---|
| 38 | Q | 6.1 | 90.3 | 0.0 | 2.5 | 1.1 | <u>28.9</u> | 1.07 |
| 39 | V | 3.6 | 87.6 | 1.4 | 4.5 | 0.0 | 6.5 | 1.03 |
| 40 | W | 3.2 | 89.2 | 1.2 | 2.3 | 0.0 | 7.3 | 1.02 |
| 41 | X | 5.1 | 83.6 | 3.5 | 6.8 | 0.0 | 6.1 | 1.10 |

| | Mechanical characteristics | | | | |
|---|---|---|---|---|---|
| Test No. | Tensile strength MPa | Total elongation % | Hole expansion rate % | Fatigue strength of forming-damaged portion MPa | Note |
| 21 | 1192 | 13.3 | 50.2 | 451 | Present Invention Example |
| 22 | 1210 | 15.6 | 40.8 | 423 | Present Invention Example |
| 23 | 1208 | 16.2 | 55.6 | 403 | Present Invention Example |
| 24 | 1176 | 14.3 | 45.3 | 396 | Present Invention Example |
| 25 | 1220 | 16.1 | 57.3 | 371 | Present Invention Example |
| 26 | 1163 | 13.5 | 48.1 | 388 | Present Invention Example |
| 27 | 1201 | 17.3 | 49.8 | 400 | Present Invention Example |
| 28 | 1164 | 14.2 | <u>30.1</u> | 389 | Comparative Example |
| 29 | 1153 | <u>10.6</u> | <u>62.3</u> | 369 | Comparative Example |
| 30 | 1209 | <u>17.3</u> | 31.3 | 366 | Comparative Example |
| 31 | 1182 | 14.9 | <u>33.4</u> | 381 | Comparative Example |
| 32 | <u>1103</u> | 16.9 | <u>36.3</u> | 446 | Comparative Example |
| 33 | | Corner cracking and slab cracking | | | Comparative Example |
| <u>34</u> | | Corner cracking and slab cracking | | | Comparative Example |
| <u>35</u> | | Corner cracking and slab cracking | | | Comparative Example |
| 36 | <u>1083</u> | 13.3 | 38.3 | <u>365</u> | Comparative Example |
| 37 | <u>1164</u> | <u>11.1</u> | 26.5 | 399 | Comparative Example |
| 38 | 1184 | <u>13.9</u> | <u>37.9</u> | <u>328</u> | Comparative Example |
| 39 | 1192 | 13.4 | 37.0 | <u>403</u> | Present Invention Example |
| 40 | 1176 | 14.2 | 38.9 | 405 | Present Invention Example |
| 41 | 1247 | 15.2 | 40.1 | 391 | Present Invention Example |

Underlines indicate that the corresponding values are outside the scope of the present invention, manufacturing conditions are not preferable, and characteristics are not preferable.

In Test Nos. 17 to 20, 23, and 25, after the hot rolling, the coils were uncoiled, the steel sheets were cut to a size in which predetermined characteristic evaluation was possible, and heat treatments (tempering) were performed in a box-type furnace. In Test Nos. 27 and 28, a hot-dip zinc plating layer was imparted by performing a plating treatment under the conditions shown in Table 2-2.

A tensile test was performed in accordance with JIS Z 2241: 2011 using a No. 5 test piece of JIS Z 2241: 2011. The tensile strength was obtained from a point where the maximum load was exhibited, and the total elongation was obtained from a displacement at fracture. A position where the tensile test piece was collected was the central position in the sheet width direction, and a direction perpendicular to a rolling direction was the longitudinal direction.

When the tensile strength was 1150 MPa or more, the hot-rolled steel sheet was determined as acceptable for having excellent strength, and, when the tensile strength was less than 1150 MPa, the hot-rolled steel sheet was determined as unacceptable for not having excellent strength.

The hole expansion rate was measured by performing a hole expansion test in accordance with JIS Z 2256: 2010. In a case where the total elongation was 13.0% or more and the hole expansion rate was 35.0% or more, the hot-rolled steel sheet was determined as acceptable for having excellent formability. On the other hand, in a case where any one of both was not satisfied, the hot-rolled steel sheet was determined as unacceptable for not having excellent formability.

The fatigue properties of the forming-damaged portion were evaluated from a fatigue strength that was obtained by performing hat forming on the obtained hot-rolled steel sheet and performing a fatigue test on the formed hot-rolled steel sheet. Conditions for the fatigue test were as described above.

In a case where the fatigue strength was 350 MPa or more, the hot-rolled steel sheet was determined as acceptable for being excellent in terms of the fatigue properties in the forming-damaged portion, and, in a case where the fatigue strength was less than 350 MPa, the hot-rolled steel sheet was determined as unacceptable for not being excellent in terms of the fatigue properties in the forming-damaged portion.

In Test No. 29 where the C content was low, the amount of residual austenite was small, and the total elongation was less than 13.0%.

In Test No. 30 where the C content and the Si content were high and Test No. 31 where the Si content was high, the volume percentage of residual austenite was high, and the hole expansion rate was low.

In Test No. 32 where the Mn content was low and Test No. 36 where the B content was low, the tensile strength was less than 1150 MPa.

In Test No. 37 where the Si content was low, the volume percentage of residual austenite was low, and the total elongation was low. In Test No. 38 where the Nb content was low, prior austenite grains became coarse, and the fatigue strength of the forming-damaged portion was low.

In addition, in Test Nos. 33 to 35, it was not possible to perform hot rolling due to nozzle clogging during casting and fine cracking in a corner portion, and thus hot-rolled steel sheets could not be manufactured.

In Test No. 9 where the chemical composition was in the scope of the present invention, but the total rolling reduction in a temperature range of 870° C. to 980° C. was less than 80%, and, in Test No. 12 where the maximum elapsed time between rolling stands in the temperature range of 870° C. to 980° C. exceeded 4.00 seconds, prior austenite grains became coarse, and the fatigue strength of the forming-damaged portion was low.

In Test No. 7 where the coiling temperature was low, the hole expansion rate was low.

In Test No. 16 where the coiling temperature was high, the volume percentage of bainite was low, and the hole expansion rate was low.

In Test No. 15 where the coiling temperature was high, the volume percentage of ferrite was high, the tensile strength became less than 1150 MPa, and the hole expansion rate was low.

Among Test Nos. 17 to 20, 23, and 25 where tempering was performed after hot rolling, in Test No. 18 where the tempering temperature exceeded 450° C., the volume percentage of pearlite was high, and the hole expansion rate decreased.

Between Test Nos. 27 and 28 where a plating treatment was performed, in Test No. 28, since the highest temperature exceeded 495° C., the volume percentage of pearlite increased, and the hole expansion rate decreased.

Figure 2:
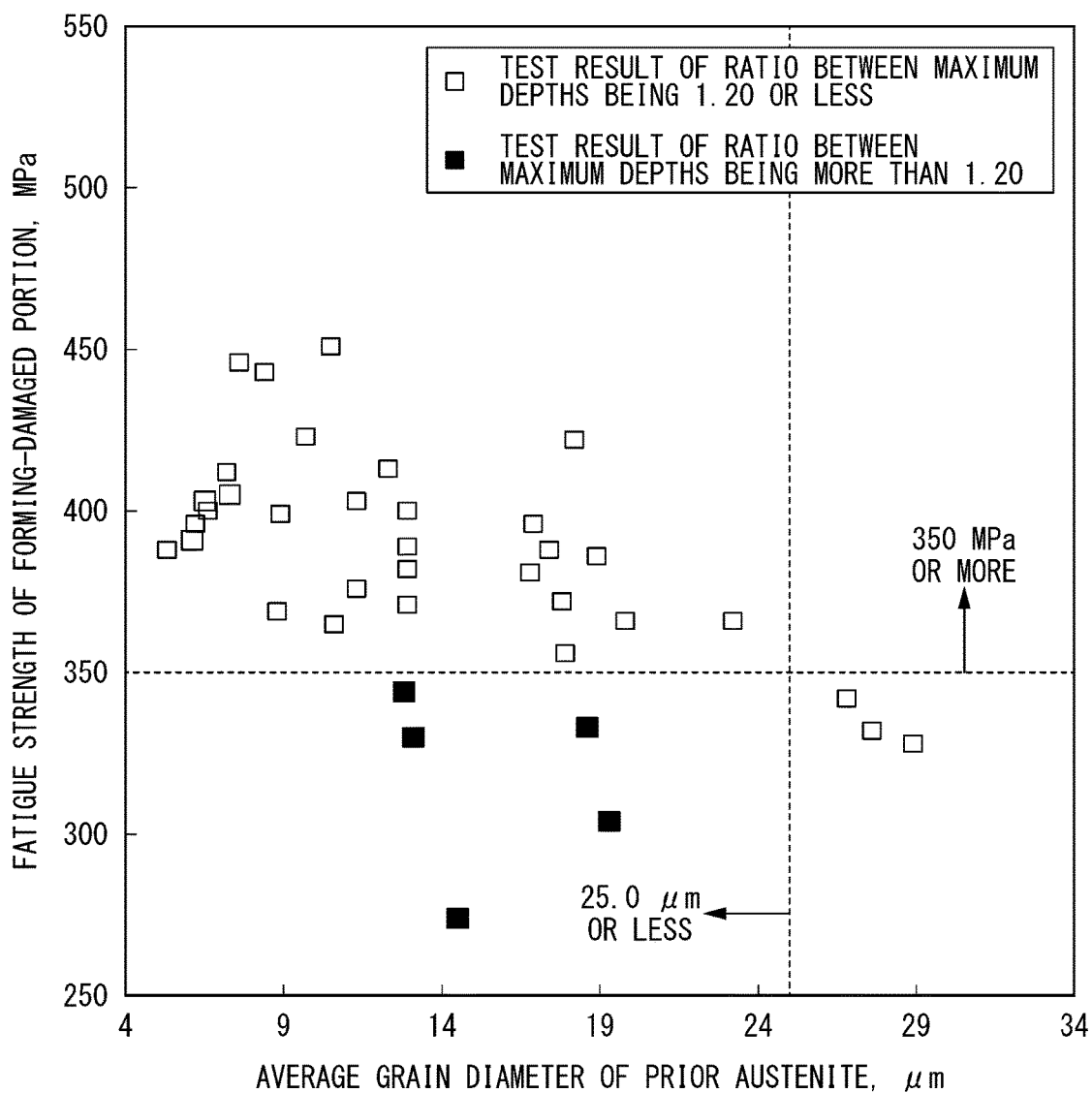
FIG. 2 is a view showing a relationship between the fatigue strength and an average grain diameter of prior austenite grains in the forming-damaged portion in the example.
Figure 3:
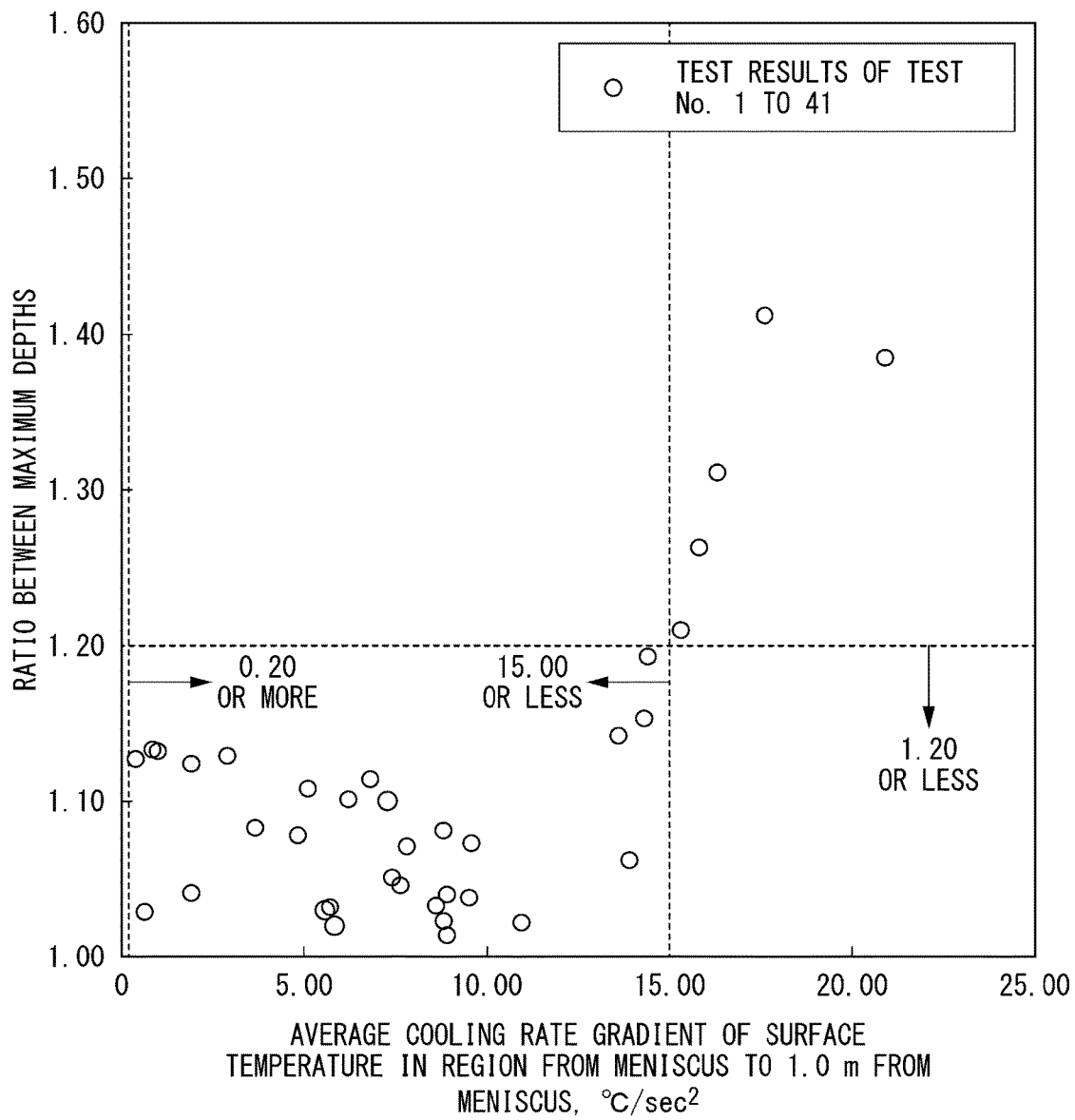
FIG. 3 is a view showing a relationship between an average cooling rate gradient of a surface temperature and a maximum depth ratio in a region from a meniscus to 1.0 m from the meniscus in the example

It was found that, unlike structure factors that govern the tensile strength, the total elongation, and the hole expansion rate, as shown in FIG. 1 and FIG. 2, the fatigue strength in the forming-damaged portion is governed by the ratio between the average grain diameter and the maximum depth of prior austenite grains (the ratio between the maximum depth of a region where, on one surface, the rotation angle between the normal line of the one surface and a (011) pole near the normal line of the one surface is 5° or less and the maximum depth of a region where, on the other surface, the rotation angle between the normal line of the other surface and a (011) pole near the normal line of the other surface is 5° or less). In addition, as shown in FIG. 3, it is found that the ratio between the maximum depths is particularly governed by the average cooling rate gradient of the surface temperature in the region from the meniscus to 1.0 m from the meniscus. As shown in FIG. 3, it was found that, when the average cooling rate gradient is within a range of 0.20 to 15.00° C./sec$^2$, the ratio between the maximum depths becomes 1.20 or less and the fatigue strength in the forming-damaged portion becomes 350 MPa or more.

INDUSTRIAL APPLICABILITY

According to the above-described aspects of the present invention, it is possible to provide a hot-rolled steel sheet having a high strength and excellent formability and having excellent fatigue properties in a forming-damaged portion and a manufacturing method thereof. According to the above-described aspects of the present invention, since the fatigue properties in a forming-damaged portion are excellent, it is possible to provide a hot-rolled steel sheet capable of reducing the depths of recessed parts in a flat portion near an R portion that is formed at the time of forming the R portion and a manufacturing method thereof.

The invention claimed is:

1. A hot-rolled steel sheet comprising, as a chemical composition, by mass %:
 C: 0.085% to 0.190%;
 Si: 0.40% to 1.40%;
 Mn: 1.70% to 2.75%;
 Al: 0.01% to 0.55%;
 Nb: 0.006% to 0.050%;
 P: 0.080% or less;
 S: 0.010% or less;
 N: 0.0050% or less;
 Ti: 0.004% to 0.180%;
 B: 0.0004% to 0.0030%;
 Mo: 0% to 0.150%;
 V: 0% to 0.300%;
 Cr: 0% to 0.500%;
 Ca: 0% to 0.0020%; and
 a remainder consisting of Fe and an impurity,
 wherein, in metallographic structures at a ¼ position in a sheet thickness direction from a surface and at a ½ position in the sheet thickness direction from the surface, by vol %,
 residual austenite is 3.0% to 12.0%,
 bainite is 75.0% or more and less than 97.0%,
 ferrite is 10.0% or less,
 martensite is 10.0% or less, and
 pearlite is 3.0% or less,
 in a metallographic structure of a region from the surface to a 100 μm position in the sheet thickness direction from the surface,
 an average grain diameter of prior austenite grains is 25.0 μm or less,
 a ratio between a maximum depth of a region where, on one surface, a rotation angle between a normal line of the one surface and a (011) pole near the normal line of the one surface is 5° or less and a maximum depth of a region where, on the other surface, a rotation angle between a normal line of the other surface and a (011) pole near the normal line of the other surface is 5° or less is 1.00 to 1.20, and
 a tensile strength is 1150 MPa or more.

2. The hot-rolled steel sheet according to claim 1, comprising, as the chemical composition, by mass %, one or more selected from:
 Mo: 0.030% to 0.150%;
 V: 0.050% to 0.300%;
 Cr: 0.050% to 0.500%; and
 Ca: 0.0006% to 0.0020%.

3. A manufacturing method of the hot-rolled steel sheet according to claim 1, comprising:
 a continuous casting step of, in continuous casting of a slab having the chemical composition according to claim 1, performing the continuous casting in a manner that an average cooling rate gradient of a surface temperature in a region from a meniscus to 1.0 m from the meniscus is 0.20 to 15.00° C./s$^2$ to obtain the slab;
 a heating step of heating the slab to 1200° C. or higher;
 a hot rolling step of performing rough rolling on the slab after the heating, and performing finish rolling in a manner that a total rolling reduction in a temperature range of 870° C. to 980° C. becomes 80% or larger and an elapsed time between rolling stands becomes 4.00 seconds or shorter in the temperature range of 870° C. to 980° C.;
 a cooling step of cooling to a temperature range of 300° C. to 550° C.; and
 a coiling step of coiling in a manner that a coiling temperature is in the temperature range of 300° C. to 550° C. after the cooling.

4. The manufacturing method of the hot-rolled steel sheet according to claim 3, further comprising:
 a tempering step of holding in a temperature range of 200° C. or higher and lower than 450° C. for 90 to 80000 seconds after the coiling step.

5. The manufacturing method of the hot-rolled steel sheet according to claim 3, further comprising:
 a plating step of performing a hot-dip galvanizing treatment on the hot-rolled steel sheet after the coiling step or the hot-rolled steel sheet after the tempering step with a thermal history where a residence time within a temperature range of 450° C. to 495° C. becomes 75 seconds or shorter.

6. The manufacturing method of the hot-rolled steel sheet according to claim 4, further comprising:
a plating step of performing a hot-dip galvanizing treatment on the hot-rolled steel sheet after the coiling step or the hot-rolled steel sheet after the tempering step with a thermal history where a residence time within a temperature range of 450° C. to 495° C. becomes 75 seconds or shorter.

7. A hot-rolled steel sheet comprising, as a chemical composition, by mass %:
C: 0.085% to 0.190%;
Si: 0.40% to 1.40%;
Mn: 1.70% to 2.75%;
Al: 0.01% to 0.55%;
Nb: 0.006% to 0.050%;
P: 0.080% or less;
S: 0.010% or less;
N: 0.0050% or less;
Ti: 0.004% to 0.180%;
B: 0.0004% to 0.0030%;
Mo: 0% to 0.150%;
V: 0% to 0.300%;
Cr: 0% to 0.500%;
Ca: 0% to 0.0020%; and
a remainder comprising Fe and an impurity,
wherein, in metallographic structures at a ¼ position in a sheet thickness direction from a surface and at a ½ position in the sheet thickness direction from the surface, by vol %,
residual austenite is 3.0% to 12.0%,
bainite is 75.0% or more and less than 97.0%,
ferrite is 10.0% or less,
martensite is 10.0% or less, and
pearlite is 3.0% or less,
in a metallographic structure of a region from the surface to a 100 μm position in the sheet thickness direction from the surface,
an average grain diameter of prior austenite grains is 25.0 μm or less,
a ratio between a maximum depth of a region where, on one surface, a rotation angle between a normal line of the one surface and a (011) pole near the normal line of the one surface is 5° or less and a maximum depth of a region where, on the other surface, a rotation angle between a normal line of the other surface and a (011) pole near the normal line of the other surface is 5° or less is 1.00 to 1.20, and
a tensile strength is 1150 MPa or more.

* * * * *